(12) United States Patent
Garman

(10) Patent No.: US 9,910,825 B1
(45) Date of Patent: Mar. 6, 2018

(54) SECONDARY SEARCH BASED ON USER SELECTION OF A FIRST SEARCH RESULT

(75) Inventor: Matthew S. Garman, Evanston, IL (US)

(73) Assignee: Kayak Software Corporation, Norwalk, CT (US)

( * ) Notice: Subject to any disclaimer, the term of this patent is extended or adjusted under 35 U.S.C. 154(b) by 0 days.

(21) Appl. No.: 11/360,826

(22) Filed: Feb. 23, 2006

Related U.S. Application Data

(62) Division of application No. 11/192,540, filed on Jul. 28, 2005, now Pat. No. 8,600,784.

(60) Provisional application No. 60/592,599, filed on Jul. 30, 2004.

(51) Int. Cl.
    G06F 7/00 (2006.01)
    G06F 17/00 (2006.01)
    G06F 17/30 (2006.01)

(52) U.S. Cl.
    CPC .............. G06F 17/00 (2013.01); G06F 17/30 (2013.01)

(58) Field of Classification Search
    None
    See application file for complete search history.

(56) References Cited

U.S. PATENT DOCUMENTS

| | | | |
|---|---|---|---|
| 6,360,205 B1 * | 3/2002 | Iyengar et al. | 705/5 |
| 6,442,526 B1 * | 8/2002 | Vance et al. | 705/5 |
| 6,625,595 B1 * | 9/2003 | Anderson et al. | 707/3 |
| 6,839,702 B1 * | 1/2005 | Patel et al. | 707/3 |
| 7,668,811 B2 * | 2/2010 | Janssens et al. | 707/999.003 |
| 7,873,660 B1 * | 1/2011 | Wong et al. | 707/781 |
| 2003/0023463 A1 | 1/2003 | Dombroski et al. | |
| 2003/0177045 A1 | 9/2003 | Fitzgerald et al. | |
| 2004/0030688 A1 * | 2/2004 | Aridor et al. | 707/3 |
| 2004/0249683 A1 * | 12/2004 | Demarcken | G06F 17/30457 705/5 |
| 2005/0044076 A1 * | 2/2005 | Wu et al. | 707/4 |
| 2005/0086087 A1 * | 4/2005 | Razza et al. | 705/5 |
| 2005/0216444 A1 * | 9/2005 | Ritter et al. | 707/3 |
| 2005/0262065 A1 * | 11/2005 | Barth et al. | 707/3 |
| 2006/0106655 A1 * | 5/2006 | Lettovsky et al. | 705/6 |
| 2007/0055555 A1 | 3/2007 | Baggett et al. | |
| 2007/0156660 A1 * | 7/2007 | Moricz | 707/3 |
| 2007/0239671 A1 * | 10/2007 | Whitman et al. | 707/2 |
| 2008/0033770 A1 | 2/2008 | Barth et al. | |

* cited by examiner

Primary Examiner — Thu Nga Nguyen
(74) Attorney, Agent, or Firm — Banner & Witcoff, Ltd.

(57) ABSTRACT

Various embodiments of the present invention relate to systems and methods used to search for information (e.g., from multiple sources). In one example (which example is intended to be illustrative and not restrictive), such systems and methods may select a subset of available relevant Internet information sources, such as suppliers and/or purchasers of goods, services, and/or commodities. In another example (which example is intended to be illustrative and not restrictive), a system and method are provided for determining when to launch an information search and for determining the set of information sources to search.

15 Claims, 19 Drawing Sheets

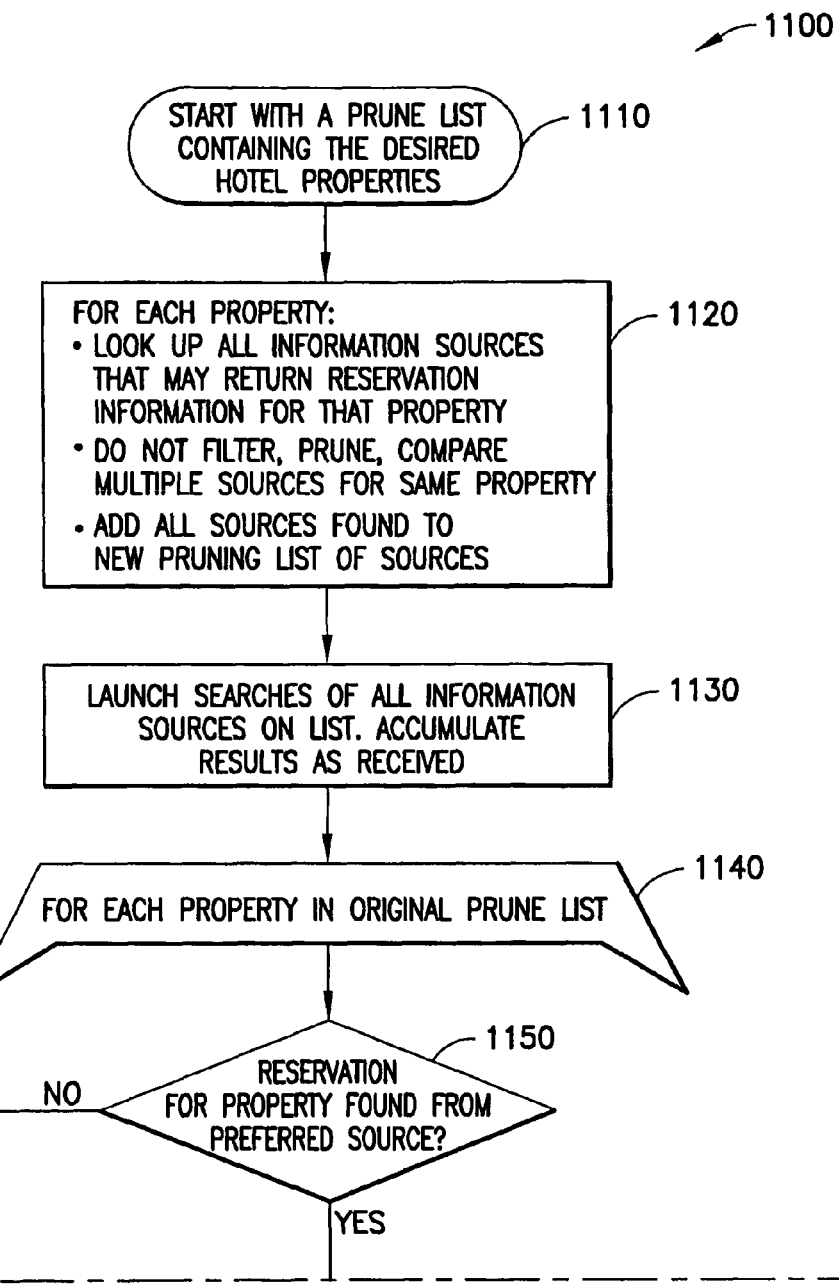

SECONDARY SEARCH BASED ON USER SELECTION OF A FIRST SEARCH RESULT

RELATED APPLICATIONS

This application is a divisional of U.S. application Ser. No. 11/192,540, filed Jul. 28, 2005, which claims the benefit of U.S. Provisional Application Ser. No. 60/592,599, filed Jul. 30, 2004. Each of the aforementioned applications is incorporated herein by reference in its entirety.

FIELD OF THE INVENTION

Various embodiments of the present invention relate to systems and methods used to search for information (e.g., from multiple sources).

In one example (which example is intended to be illustrative and not restrictive), such systems and methods may select a subset of available relevant Internet information sources, such as suppliers and/or purchasers of goods, services, and/or commodities.

In another example (which example is intended to be illustrative and not restrictive), a system and method are provided for determining when to launch an information search and for determining the set of information sources to search.

BACKGROUND OF THE INVENTION

Various types of search systems and methods and travel management systems and methods have been proposed.

For example, U.S. Pat. No. 6,360,205, entitled "obtaining and utilizing commercial information" has disclosed a method for providing reservation information related to airline flights, lodging, transportation and the like using a communications network. In one embodiment, access to a server machine is divided into sessions. During a first session a user machine makes a first request for reservation information from the server machine. This first request includes input data from a first customer which relates to the desired reservation information. For example, the first customer may input travel times in the hopes of booking a flight which corresponds to those times. The server machine requests the reservation information from a number of target sites based upon the input data. Included in the number of target sites is a first and second target sites. The server machine obtains reservation information which includes first and second reservation information respectively from the first and second target sites.

In another example, U.S. Pat. No. 6,442,526, entitled "system for corporate travel planning and management" has disclosed a system and method for processing travel data and travel receipts. Travel data including travel segments is received by the system. Receipts for the trip are also received from a credit card provider. The received credit card data and travel data are each converted into a predefined format. The converted information is compared to match information in the receipts and the travel data such as chain codes or dates of travel. A list of matching data is output, such as to use in preparing an expense report.

Figure 1A:
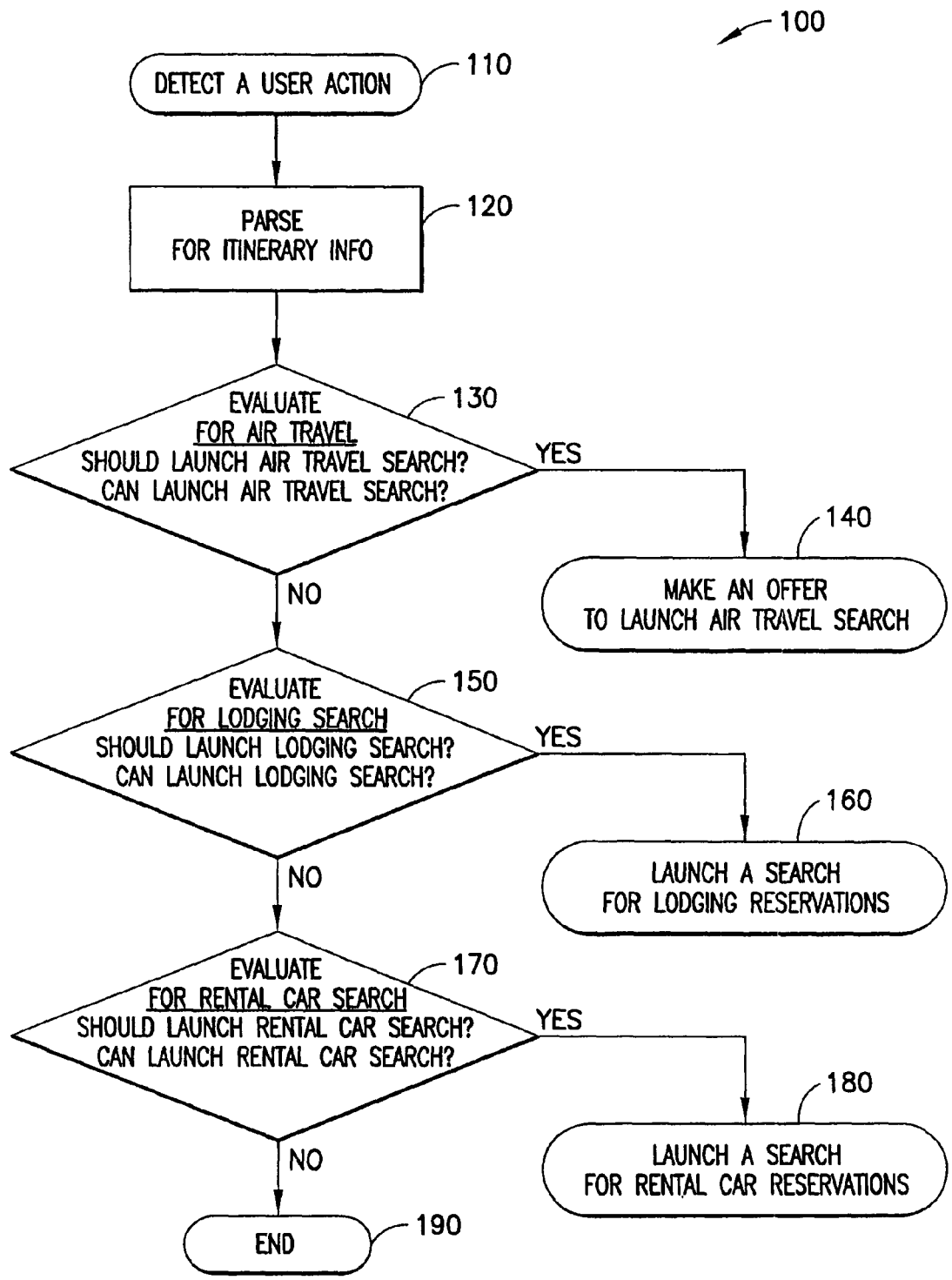
FIG. 1A is a flow diagram of the decision to automatically launch a search for travel information in an embodiment.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Information search systems, and particularly Internet search systems, can be broadly divided into two categories: "generic" search engines that match search terms against the text content of documents (web pages), and domain-specific search engines that attempt to search only certain categories of information. Generic search engines typically treat the information they find at the lowest-common-denominator level of raw text. In contrast, domain-specific search engines, sometimes called vertical search engines, often have the ability to determine the meaning and context of some of the information they find, and are therefore able to perform more complicated and focused searches.

For example, when a generic search engine indexes a page on a travel agent web site that lists flights between different cities, it will subsequently only be able to find that page in response to queries that contain strings that exactly match text strings on the page. If the page lists only airport codes, then a user would have to search for "SFO" rather than "San Francisco" to match. If it lists exact flight times, then a user searching for "morning" would not be more likely to find a page listing a departure at "10:07 AM".

Alternately, a travel-specific vertical search engine would likely be capable of parsing such a web page for the data fields that are useful to a travel search, and then normalizing that information so that it can be matched against the meaning and intent of subsequent queries, rather than simply their exact text.

Some domain-specific systems operate by gathering and caching information, which it then searches in response to user queries. This type of system is analogous to many of the generic search engines, which also report results based on their local caches. However, many information domains contain information that is highly fluid, and any two searches of the same information supplier are likely to yield different results. For systems that search for this type of information, each user query for information should generate corresponding, immediate queries of the available information sources.

The search system and methods described here are, in one example, intended to be used for domain-specific searching for time-variant information, although they can be customized for a wide variety of information domains and search targets, and could be used for information that changes less frequently.

In the case where a search system is intended to search for travel reservation information, the information sources to be searched can be generally divided into two groups. The first group is web sites that are maintained by suppliers of particular travel items, while the second group is made up of the web sites of various travel agency, broker, or merchant organizations that sell reservations actually provided by other organizations. Travel agencies include organizations with a broad range of business models, including traditional travel agencies that receive fees from the travel providers, ones which receive fees from the consumers, ones which specialize in "distressed inventory," ones which operate on an auction basis, etc.

Typically, an existing domain-specific search system would, broadly, receive an information query from a user, make a number of derivative queries, then analyze and present the results of the multiple queries to the user. Within such a system, there are many potential inefficiencies and opportunities for improvement.

In determining when to launch a search, many types of inputs from the user can be monitored and evaluated. In one type of search systems, the user can explicitly navigate to and fill in a form or other user interface to specify the query that they want. In more advanced systems, other user actions, not primarily intended for the search system, can be monitored for "implicit" requests of the search system.

In one embodiment, the search system monitors user inputs to their internet browser system in order to detect operations that can be interpreted as search queries. There are a wide variety of mechanisms that can accomplish this, differing with each available combination of browser software and underlying operating system. One case is that of Microsoft Internet Explorer (IE) running within Microsoft Windows. IE specifically provides public interfaces for third-party software components to be "plugged in" to IE and operate as "browser helpers" to provide a wide variety of additional functions, within the Internet Explorer environment, these are implemented by software components called Browser Helper Objects (BHOs).

A search system implemented, possibly only in part, using a BHO could monitor essentially all types of user inputs to the browser: mouse pointer movement, selections, manipulation of user interface elements in a web page, data provided through web forms, the URLs of web pages requested and viewed, and the contents of requests made to web servers. Of all of this potential information, only a fraction is needed for most potential search systems.

One data set that can be monitored is the contents of HTTP requests originating from the browser. Not only do these specify, through the URL, the next resource the user has selected to view, but "cookie" values and form input data included in the request reflect user's input to the HTTP server. This information can be used to determine if the user has filled in a form or otherwise made a request for information from a third-party system, for which an instance of the current search system is also capable of attempting to supply relevant information. The search system can then respond to this type of user request (an implicit request, generated by the system in response to a detected action) and begin interacting with the user. The system's interaction with the user can either be in parallel with the user's browser's HTTP request (the search system allows the original user action to proceed) or instead of allowing the request to be sent (either canceling or suspending the request).

On detection of such an implicit search request, the search system can respond in several ways. One possible set of responses, described in more detail below, would be for the system to immediately launch a search for information. Another possibility is for the search system to notify the user that it has the ability to perform a search on the user's behalf and ask the user if it should proceed. In some applications, this type of response can have benefits both for the user and the search system. If the user would not be interested in possible search results, then they may be able to simplify the system's display by preventing the search. As for the system itself, each set of information searches it performs consumes resources, and if the search results will not benefit the user, then it can be a system optimization to allow searches to be prevented. In both cases, whether the search is launched immediately or only after user approval, the search(es) performed by the system may be directed toward finding similar types of information to that requested from the third-party system, or complementary or otherwise related information.

Depending on the type of information a particular search system is configured to find and present, the set of opportunities for detecting and launching a search can be quite varied, with the potential for multiple opportunities to occur within a single interaction session between the user and a third-party information system. The particular opportunities for launching a search to which the search system actually responds can drastically alter the user's perception of the search system and its capabilities, which in turn affect the user's confidence and interest in the search results and ultimately their willingness to do business with the result provider.

An example would be a search system that is intended to find and present information on the availability of travel reservations. Such a system could search information suppliers for available airline tickets, lodging reservations, rental car availability, travel packages, cruise reservations, bus service, train tickets, and so on. This system could detect implicit information requests by monitoring user interactions with third-party travel-related web sites.

Depending on the particular third-party web site, there may be a number of points at which an implicit request can be made. The first point is likely to be when the user has entered itinerary information, such as their dates of travel, origin, and destination. With this information, the system could launch a search for most types of travel reservation information. If the user is searching for a particular type of travel reservation on the third-party site (an airline reservation, instead of a lodging reservation, for example), then the search system may confine itself to searching for only that type of information, or it may search for all of the types of information that it supports for which sufficient query information is available from the user.

In one example, some types of itinerary information may be desirable prior to starting a search. For example, a partial itinerary that contains only a departure date without a return date may not be used to start a search, because it is may be difficult to guess an appropriate return date. Alternately, the search system could choose to launch a different type of search, potentially of radically different information sources. For example, in response to an "open" itinerary, the search system may search information sources that provide travel-availability information (times of day when flights in the desired market occur, or differences in potential cost of the trip depending on the different return dates the user may select.) Additionally, many details of an itinerary (desired seating class for air travel, quality and type of lodging, etc.) may be filled in with common values to allow the search system to launch a search with a less complete itinerary that might be available earlier in the session between the user and the third-party web site.

Alternately, the user's query of the third-party information source may be even more focused, such as a reservation from a particular carrier, or a hotel room in a particular hotel or hotel chain, or a particular class or model of rental car. In this case, the search system has the option of launching a broad search, possibly finding something the user hadn't anticipated, or launching a narrower or "specific" search, matching the information the user requested from the third-party source.

In both of these cases, where either a broad search or a narrower search is performed, a benefit for the user in the case of travel reservation information are the price comparisons such a search system can provide between product options available for purchase through different outlets and suppliers.

Another point at which the search system may launch a search is when the user selects an item from a list of alternatives presented by a third-party information source, possibly as results to an earlier query. Regardless of the types of items listed, information allowing the search system to launch a query can be derived either from the contents of the selected list item itself or accumulated from the sequence of exchanges between the user's browser and third-party information supplier.

However the information making up the query is collected, the search system can attempt to find a number of different types of information: alternative ways to purchase the item selected by the user, alternative items that the user might prefer to the item selected, and/or complementary items in which the user might be interested in addition to the item selected. For example, in the case of a system specializing in travel information, the system may respond to a user selection of a specific airline reservation by performing one or more of a wide variety of searches, such as: for alternate possible airline reservations, for alternate purchase sources or prices for the same airline reservation, for lodging and/or car reservations in the destination city, and/or for travel insurance alternatives that cover the itinerary selected.

Note that the same search system may perform multiple searches within a single user session on a third-party system. In the travel case, the system may begin by launching a broad search based on the initial itinerary information supplied to a third-party system. Then later in the session, the user may select a specific item returned by the third-party system. The search system can respond by launching a more narrow search intended to "find a better deal." Where there is the potential for multiple searches to be launched in a single user session, the search system may provide the user a mechanism to retrieve those previously-viewed results that are still valid.

Finally, the search system can further optimize its operations by retaining one or more of a user's most recently searched itineraries and the results returned by that search. Users sometimes repeat identical searches within a session and, provided that the retained results have not aged beyond validity, performance can be improved by retaining these results and "pruning" out entire subsequent searches.

Each of these alternatives for when a search is launched also has implications for the set of information sources that will be searched and the manner in which search results, when obtained, will be presented to the user.

In a search system that searches multiple information sources on behalf of a single, possibly implicit, user query, there will typically be a large set of potential information sources that the system is capable of searching. In order to optimize its operation, it may be desirable to create a separate list of information sources to search for each query, and to "prune" possible information sources from this list using methods that attempt to predict the sources that will yield (more relevant) results and to predict and eliminate those that will not. Note that while some of the methods presented actually operate by building up a list of information sources, they are all collectively presented as pruning methods because they all generate lists of information sources that contain fewer entries than the complete set of information sources the search system is capable of accessing.

The type of pruning methods employed will likely vary based on the types of information a search system is designed to provide and the particular query that is being performed. For example, an embodiment may employ both common pruning methods and category-specific pruning methods when searching for airline reservations, lodging reservations, or rental car reservations.

Pruning can be performed directly on the potential information sources or indirectly on lists of information items that might be found, which are then mapped into a list of the information sources capable of returning those items from searches.

For example, when searching for an airline flight between two particular airports, many different lists of information sources can be created. One example would be to search every information (airline reservation) supplier available to the system for the desired flight. However, given the realities of the airline industry, many of these searches would return no results at all. A basic way to perform pre-search pruning for airlines is to use information about the actual flight schedules and airport service provided by airlines to generate the list of suppliers that will be searched. This could be accomplished by creating an exclusion list (e.g., for each airport pair, list carriers that should not be searched) or by creating an inclusion list (e.g., analyzing the published airline flight schedules to determine, for each possible airport or city pair a list of carriers who DO offer flights). This is a mapping from desired types of items (flights between a given airport pair) to some information suppliers that should be searched (e.g., airline reservation web sites).

A more complicated step beyond this would be to qualify each carrier in an inclusion list associated with an airport pair based on the times of day during which the carrier provides flights, or the dates the carrier is operating.

However, this form of pruning does not account for information suppliers that do not have a one-to-one mapping with an airline. For example, most airlines operate their own web sites from which available flights may be found, but there are also a wide variety of types of travel-agency web sites which typically offer flights on multiple different airlines. This too can be accommodated at several different levels of complexity and accuracy. In another example, after pruning the list of airline-specific web sites, all available travel agency web sites can be added to the list of information sources to search. Or, having generated a list of airlines that service the desired airport pair, data listing the airlines available through each available travel agency-type web site can be used to create a list of just those travel agency sites that supply reservations for one or more of the identified airlines. This list can then be merged with the list of direct airline suppliers to form the full list of information sources for that particular airline reservation search.

Analogous steps can be performed when pruning a set of information sources for lodging reservation or rental car reservation searches, using (for example) data that lists the locations in which a particular hotel chain has properties. The derived list of hotel chains can then be used to identify chain-specific and travel agency web sites.

Unlike airline travel, in which a given carrier serves only a very specific set of travel options, in rental cars there are a number of large rental companies that serve virtually all markets within the United States. Thus, pruning for searches for rental car reservations can be done by combining a set of information sources that will always be searched (the large companies and possibly some travel agencies that sell reservations for them) with a list of information sources that represent smaller suppliers and which is pruned using the desired rental-car pickup location.

Other "pruning" methods expand the list of information sources to search rather than reducing it. For example, when searching for airline flights, there are often "better" flight options (as determined by the user's preferences) available when traveling from airports that are near (but not the same as) those actually requested by the user. To provide for such cases, prior to generating a list of information sources to search, a set of airport pairs can be created, consisting of the nearby airports at the origin crossed with nearby airports at the destination. A similar process can be used when the user's request identifies cities rather than airports, and either or both cities contain multiple airports.

When searching for a single item, such as a room at a particular hotel or a single class of car from a desired rental car company, pruning can proceed as described above, mapping from the desired item to the set of information suppliers that may provide that type of item. In the case of a narrower search query, pruning is expected to result in a smaller list of information suppliers than would be generated for a broader query.

For some pruning methods, it can be beneficial to associate preference information with information sources or with underlying suppliers (e.g., airlines, hotels, etc.) that can be accessed through one or more information sources. Preferences can be expressed through assignment of numeric scores, by categorization, or through any other mechanism that is compatible with the specific implementation of a pruning mechanism. Preferences may be based on considerations that are related to user groups ("most popular") to the specific user performing the search ("previously selected by user," "user belongs to a rewards program"). Preferences can also be related to the implementation or business of the search system itself. For example, information sources to which the search system has an exceptionally high efficiency network connection, or with which the search system's operator has a business relationship, may be preferred.

An additional level of complexity is introduced by the fact that the same information item (e.g., an available airline reservation) may be returned from multiple information sources, possibly with differences (such as different prices).

A pruning method that can be applied to searches for airline reservations involves pruning based on the "home" countries of the air carriers versus the countries where the origin and destination airports are located. When the origin and destination are in separate countries, it is generally best to search all of the information sources that could provide reservations for that route. However, if both origin and destination are in the same country, it is generally not beneficial to search information sources associated with air carriers whose "home" country is not the country containing the airports, and might even be contrary to local regulations for such carriers to sell such reservations. For example, even if an Australian airline will sell tickets for a route between two airports in the United States, it is unlikely that this route will actually be preferred by users to one provided by a US-based airline. There are, or course, a handful of airlines that should not be pruned out of some countries by this type of rule, such as airlines that have "$5^{th}$ country travel rights" in their non-home countries.

For more comprehensive pruning of airline reservation searches (for example), a hierarchy of pruning data can be created, so that each level of the hierarchy can specify either the inclusion or exclusion of a particular carrier, with the different hierarchical layers "cascading" so that settings at the lower (more detailed) level of the hierarchy override those at a higher level. An example of the levels in such a hierarchy could include system-wide settings, national and regional settings, settings for each possible airport pair, and settings that depend on the direction of travel between the airports in a pair. Regions could be defined at either or both the supra-national level (e.g., which might be used to group adjoining small countries in Europe) and the intra-national level (e.g., defining the eastern, central, and western United States as different regions).

In such a system, pruning would begin with the list of all carriers (separate from information sources) supported by the system. Those carriers turned "off" at the global level of the hierarchy would then be removed from the list. The settings associated with the large region containing the desired origin and destination would then be applied, possibly both eliminating some carriers from the list and adding back in some that had been excluded at a higher level. This process would then be repeated at each hierarchical level until the most detailed information has been incorporated and a final list of carriers is achieved. For routes where the origin and destination airports lie within different branches of the data hierarchy (for example, in different countries in a system where nationality makes up a level of the hierarchy), the system can contain either a general rule and supporting data for how the pruning should be updated for each given level of hierarchy, or there can be separate specific lists of carriers to include and exclude based on the pairing of entities (for example, countries) at that level of the hierarchy.

Another use of a hierarchical rule system would be to modify the pruning list generated by a another system. For example, the results of a basic pruning using a data table that contains an entry for each market that lists the carriers which serve that market could be treated as the output of the "global" level of hierarchy. The hierarchical system would then be employed only to apply pruning rules that customize the list accounting for special cases and other circumstances that are difficult to represent with the more limited table of market information.

As a more specific example (which example is intended to be illustrative and not restrictive), consider a query for possible airline reservations between San Francisco and Los Angeles. This could be processed from initial query into a list of carriers using a hierarchical set of pruning rules as follows:

First, city names may have to be resolved to one or more pairs of origin and destination airport codes before pruning can proceed. For this example, assume that the itinerary was entered using the specific airport codes SFO and LAX, so only one origin/destination pair has to be handled. Handling for multiple pairs (such as the set of pairs made up of SFO and each Los Angeles-area airport) could proceed as described here for each pair, with the resultant lists then merged (e.g., as a union or using a more complicated, preference-based arrangement) prior to moving to the next stage of pruning.

At the "global" level of the example pruning rules hierarchy, only the largest air carriers would be included in the pruning list, with more local carriers excluded. Perhaps the initial list of carriers would contain only one or two carriers that provide (near) world-wide coverage of major airports. Or, perhaps the search system under consideration is more narrowly focused. For example, a system whose user interface is entirely in English is likely to serve only English-speaking users. In this case, the "global" level of the hierarchy would apply only to the system's area of service, and it would likely specify the inclusion of a larger number of carriers. A benefit of allowing pruning to be specified hierarchically is that each pruning rule need be included in the system only once, and each carrier should be mentioned only a small number of times.

At the "national" level of the hierarchy, other carriers would be added. In this example, since both origin and destination are United States airports, the system's United States pruning rules would be applied, and nation-wide air carriers would be added to the pruning list. In addition, if one or more of the carriers added at the global level does not provide service within the United States (that is, the US is an exception to their general behavior of providing service everywhere), then a US-specific pruning rule would cause them to be excluded. Note that in all cases below the "global" level of the hierarchy, there would (in this example) be multiple rule sets present at each hierarchical level, with the particular rule set to be applied determined by how the specific query information (itinerary) matches against the available rule sets (nations).

At the regional level of hierarchy (in this example, the western United States), smaller carriers like Southwest would be added to the list of carriers.

For this example, assume that there are no carriers that fly within this region but not between this particular airport pair or that fly only between this airport pair. If these circumstances did occur, then they would be addressed by rules at the pair-level or directional level of the hierarchy, respectively. Obviously, this example, including the set of hierarchical levels used, is not only travel and airline specific, but is specific to a particular system implementation. Search systems designed for other types of information would have their own domain-specific hierarchical breakdown.

It is also possible that the intermediate list of carriers is not binary but tracks the preference of each listed carrier instead. In such a system, rather than simply adding and removing carriers from the list as described in the example, each step in the process could increase or decrease scoring information associated with each carrier. Then, at the completion of this part of pruning, when the set of carriers is mapped to a set of information sources that can actually be searched, the preference information associated with each carrier could be used in conjunction with that associated with each information source to determine the actual set to be searched.

The hierarchical organization of rules and data in the pruning system presented here provides similar benefits to the maintainer of the pruning rules that object-oriented programming languages do to programmers. Rather than having to, for each and every carrier supported create data that defines how the carrier should behave for every possible market, the administrator of a set of hierarchical pruning rules need write each rule only once, provided that it is located in the appropriate level of the hierarchy. Just as a programmer in an object-oriented language need specify a data element or an operation only once, with no replication, provided it is placed at the correct point in the object inheritance hierarchy.

Figure 5:
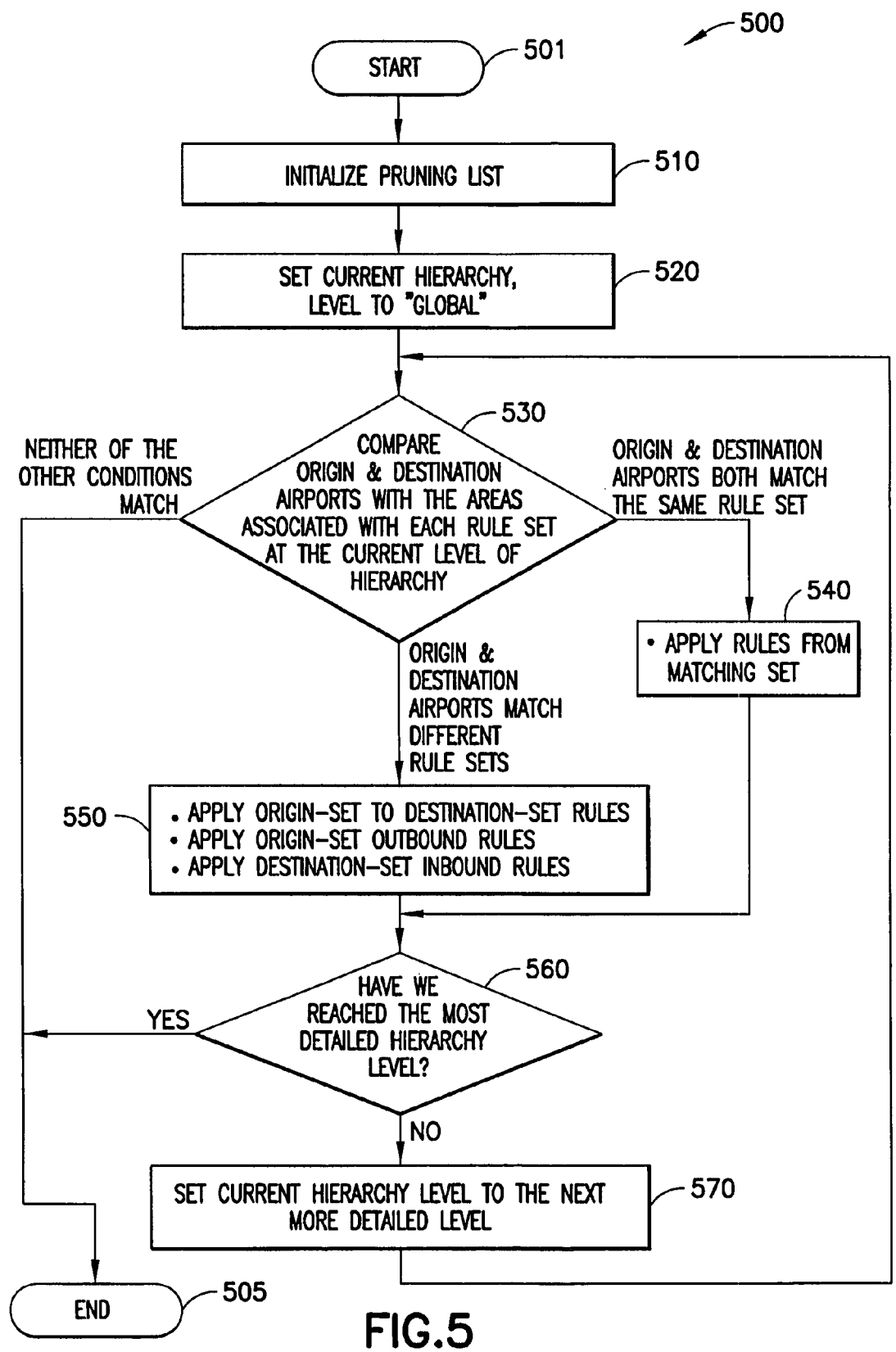
FIG. 5 is a flow diagram of the loop used to apply hierarchical pruning rules during pruning for an airline reservation search of an embodiment.

Organizing the pruning rule sets into a hierarchy of increasingly-specific geographic areas (the lowest levels of which are individual airports and individual travel directions within a market) provides convenient, logical "buckets" into which pruning rules of all different levels of specificity and scope may be placed. In operation, a system using hierarchically-specified rules may in fact operate hierarchically (as shown in FIG. 5), or it may operate by "flattening" the rule set to in fact produce a listing of all the rules that apply to every single market supported by the system. In such a circumstance, it is possible that some optimizations may be made (where a rule at one level of the hierarchy is overridden, at least in part, by a rule at a lower, more specific level). The choice between these implementation styles has no impact on the savings in effort that is provided to those who have to manually administer pruning rules.

In contrast, data extracted from published airline route tables is naturally non-hierarchical. In addition, depending on system implementation it may be beneficial to pre-compute the pruned carrier and information source lists for popular origin/destination pairs (sometime referred to as markets), and/or to cache these lists for reuse each time the system is required to compute them.

Once the list of carriers has been pruned, it can be mapped into a list of information sources. Note that at this point, one goal is to compute an accurate list possible of carriers that service the desired route, in the most direct and easy-to-maintain manner. No pruning has yet been done based on the potential merit of the reservations that might be found for each carrier. Typically, reservations for each carrier will be available from at least one internet-accessible information source. When compiling the list of information sources to search, several factors should be taken into account. First, unlike the carrier list, the list of information sources is typically most useful if sorted by priority or importance, so that if the pruned list is too long to search all of the sources at once, those from the "top" of the list can be searched in an initial pass. In cases where more than one information source can be searched for reservations on a given carrier, various forms of preference information can be used to determine which source(s) to include in the pruned list, and the relative position those sources should have within the list. This positioning can also be adjusted based on preference information on the carrier itself (e.g., does the user whose query we're processing belong to a carrier-specific rewards program). Note that it may be beneficial to organize preference information hierarchically, just as carrier-selection information can be, to allow the same information source to be preferred differently for different particular user queries.

Another optimization that can be performed while pruning the list of information sources is to substitute a single information source that offers reservations on multiple carriers (such as a travel agency) for several independent carrier-specific information sources. This can reduce the amount of processing overhead and network bandwidth required to execute a particular query.

There are also some information sources which can be handled by the system as if they were actually multiple different sources. As indicated above, some information sources differ from each other in the "breadth" of information that might be returned, such as the difference between a carrier-specific information source and a travel agency (that may provide multiple carriers and/or multiple reservation types). However, there are also different "depths" to different information sources. For example, some travel agency web sites always return a fixed number of results, regardless of the query. Others break their results across multiple pages, and the search system needs to perform a more involved session with the information provider to retrieve more results. Other web sites have different "modes" that can be selected when a search is performed or are capable of returning different search results depending on the sequence of page fetches that occur in a session prior to the search. The search system may handle sites of different depth using a single software component that is parameterized to select the particular search behavior that is desired, or have several different software components for a single web site, each of which generates a different flow to the session and access different capabilities of the web site. In either case, however, the different depths of a single information source are generally best handled independently during pruning, each with its own mapping to carriers, preference information, etc.

Having constructed a pruning list, the search system may retain information about which information sources are capable of returning comparable items (for example, reservations for the same route and times on the same carrier). This information may subsequently be used during processing of the search and presentation of the search results to ensure that potentially-inferior results from one information source are not presented to the user before results (or a failure state) are received from all of the other information sources that can return comparable items.

Many of the methods for pruning airline reservation queries can be applied to lodging and car rental reservations. However, there are other pruning methods that relate to these reservations as well.

In particular for hotels, there are usually many more options in a particular area than there are flight options between a typical airport pair. Thus, while it is reasonable to create a pruned list of air carriers that includes all carriers, such a list of hotels in dense areas would be too large. In one example, a list of potential hotels in a region can be pruned using a database listing the individual properties in an area, including specific location, rating, and related preference information. Comparing a particular itinerary query against this database and preferences, an initial list of the most-preferred possible hotels is created. This list will typically be limited in size based on hotel count or on minimum-levels of preference for inclusion.

There are several different ways in which locations may be specified in an itinerary, each of which may be normalized so that they can be matched against database entries. It is common for searches for lodging to be based on many types of input, including (but not limited to): city names, airport codes, street addresses, ZIP codes (or equivalent postal codes outside of the United States), names of landmarks, names of specific hotels, or any other information that can indicate a desired area for the hotel (telephone numbers or their prefixes, etc.).

In the case of a specific hotel name, pruning can be performed by searching the database for that hotel itself. The pruned list may be expanded beyond this single hotel, depending on the type of search being performed, by using, for example, the location, rating, and preference information associated with the specified hotel as an implicit query to find similar or complementary lodging options.

In other cases, the location may be normalized into a set of physical coordinates, such as (for example) latitude and longitude, and a search radius. Typically, the search radius will be smaller for more specific locations specifications (e.g., street addresses or landmarks) and larger for more general (e.g., cities, ZIP codes). The coordinates for specific addresses are deterministic, but those for broader areas like cities and ZIP codes are more difficult to determine "correctly". However, there are many databases available that attempt to give "center" coordinates for areas, and provided the search radius is large enough, these are adequate.

It may also be desirable to map the distance from the search location (or from the center of the search area) to a particular hotel into a preference value. Thus, instead of the radius criteria being a step function used only to include or exclude a property, it can grade different properties relative to each other. A correctly designed mapping function between distance and preference can allow possibly more preferable hotels farther away from the center of the search to be presented along side those that would have been included by a binary radius check. A distance mapping function can also be used to make better conversions from geographic locations to preferences in the case where the user has selected an area in/from which to search for a hotel rather than an address or other point. For example, if the user has specified a neighborhood, a ZIP code, or other type of destination area, then the distance mapping function could generate an identical preference value for any property contained within the area selected, rather than attempting to give preference to properties nearer the geographic center, or it could generate gradually-decreasing preference values for properties outside of the area based on their distance from the boundary, rather than the center.

When pruning using preference information associated with each property, whether the preference is mapped from another source like distance, or otherwise, the preference values assigned to particular criteria can be varied based on user information, either specific to the current user or derived for a category of users. For example, the availability of amenities at each particular property can be used to create preference information for the property. This may be done using fixed or assumed preference values for each kind of amenity, or the values can be moderated. For example, if the system knows that the user travels with their computer, then a larger preference improvement can be given to properties that have internet access. Or, if the user has previously expressed an interest in exercise facilities, then properties that have a gym may be assigned a higher preference.

In any event, when available, many aspects of the itinerary information can be directly applied to exclude possible properties. These include the "class" of property the user desired (sometimes expressed as a star rating), as well as desires for specialty property types such as suites, vacation rentals, etc.

Having generated the pruned list of hotel properties, it then is mapped to a list of suppliers as is done with airline reservation searches. The list of information sources is condensed so that it accounts for the fact that many properties will typically be available through each information source (such as all of the Holiday Inns in New York) and each information source occurs in the list only once. However, it may still contain multiple information sources capable of returning a reservation for the same property, analogous with airline reservations. If several comparable results are received when the search is executed, the results can be further pruned, using hotel reservation-specific methods, prior to presentation to the user.

As with all systems that attempt to anticipate what people might want, there will be times when the search system's pruning process excludes results that may be of interest to the user. To provide for these occasions, the search system may make a "more results, please" selection available to the user along with the results from a search. If the user does not wish to immediately pursue any of the initial results, they can make this selection. In response, the search system will launch a new search using the same query parameters as the original search but with different pruning. The pruning list from the original search may be retained, and when "more results" are requested, the already-searched information sources may be removed from the list allowing the information sources with lower preferences to move up to the top. The number of list items on which searches will actually be performed can then be limited as in the prior search, and a new search executed.

When the system expands its searching to information sources that were initially "pruned out," this expansion should not include information sources that have no possibility of returning useful results. For example, for airline reservation searches, the pruning performed on the list of carriers is not revisited, because that pruning is intended to produce a comprehensive list. Alternately, for lodging reservation searches, the initial list of properties is pruned and limited based on preferences prior to forming the list of information sources, so this list must be revisited when looking for "more" hotels.

Note that in addition to retaining the lists generated during the initial pruning for a query, the search system may also retain search results that were received during the execution of the initial search but which were "pruned" prior to being presented to the user. Some or all of these results may also be presented to the user in response to a request for more search results.

FIG. 1A is a flow diagram 100 of the decision to automatically launch a search for travel information in an embodiment. In this example, the system is intended to automatically launch a search for hotel (lodging) and rental car reservations when a user action containing an itinerary is detected, but to make an offer to the user to perform a search if an air itinerary is detected.

This particular set of search versus offer goals is an example only. Whether an actual search system would implement this specific set of policies would depend both on the business and design goals of the system. In addition, a system may apply a different set of policies (to determine whether to automatically search or only offer to search) to each particular user action detected based on the context in which the action was taken. For example, the search system may choose to automatically search in fewer cases if the user action was taken within the context of a web site affiliated with the search system than for a truly-independent third-party site.

Note that in this and virtually all other methods of the invention where the search system detects and responds to a user action, there are actually several different possibilities encompassed. First, detection of a user action can be done either directly, when the user is intentionally interacting with the search system, or indirectly by the search system monitoring user interaction with other software or network services. Second, while most of these examples really are specialized for responding to user actions, in general the search system may detect and respond to information or events generated by the user, information or events generated by software acting on the user's behalf, and/or information or events generated by a third-party system with which the user is interacting. A specific example of this given below is when the search system examines a web page returned by a third-party site containing price information for a hotel reservation. The search system responds to the third-party system's "action" of providing this information by launching a search specifically intended to find results that will compare favorably to this information. In the general case of a search system that is not specific to travel reservation or even retail information, the search system may respond to many events and types of information generated by a third-party information source. For example, a search system intended to find news articles on the Internet could detect news information presented by a web site and respond by launching a search for related news articles from other news information sources.

The operation starts with the detection of a user action 110 that may contain sufficient information to launch a search. Typically, the mechanism for performing this detection will be "light weight" and "conservative" intended to perform a check that finds anything that might contain sufficient information for a search with a minimum amount of processing and complexity.

After capturing the information associated with the user action, it is parsed 120 to extract the itinerary data supplied by the user. Typically, the parser will be specific to the source from which the information was captured. A single parser may be able to generate information sufficient for several different types of searches (air, lodging, rental car, etc.) or for only one type. Each individual user action parsed may or may not contain sufficient itinerary information for a particular type of search, independent from other types.

The next step is to evaluate for an air travel search 130 the parsed itinerary information. This evaluation must determine whether the system should consider launching an air travel reservation search, and whether the itinerary contains sufficient information to execute such a search. The determination whether the itinerary contains sufficient information to launch a search must be performed only after it has been determined if a particular type of search is desirable, because each type of search requires a different minimum set of itinerary information. Different systems may employ different criteria to determine whether to launch an air travel search. For example, if the information source from which the user action was captured was an itinerary entry form of an air-travel supplier web site, the system could launch an air travel search of its own, attempting to provide the user with direct comparisons. Alternately, a system may also respond to capturing itinerary information from a hotel web site's reservation confirmation page by launching a search for an air travel reservation from the user's home address to the city in which the hotel is located (an "upsell" attempt).

If the evaluation for an air travel search is positive, then the next step is to make an offer 140 to the user to conduct an air travel reservation search on their behalf. Processing the user's response to this offer and actually performing the search are not described in the context of this flow. The system's ability to either automatically launch a search or to offer to launch the search can have an impact in both technical aspects of the system (reducing the system processing power and third-party information source bandwidth consumed by searches that are not of interest to the user) and in usability aspects of the system (altering the user's impression of how responsive or intrusive the system is or of the amount of personal information to which it has access).

If the evaluation for an air travel search request is negative, either because an air travel search is an undesirable response in this case or because the itinerary information was insufficient, then the next step is to evaluate (the itinerary information) for a lodging reservation search 150. As before, we determine (in a system-specific way) if a lodging search is desirable and if it is possible with the available itinerary information.

If the evaluation for a lodging reservation search request is positive, then the next step is to then launch a lodging reservation search 160. The actual search and presentation of the search results are not described in the context of this figure.

If the evaluation for a lodging reservation search request is negative, then the next step is to evaluate for a rental car reservation search 170, for desirability and possibility.

If the evaluation for a rental car reservation search request is positive, then the next step is to launch a rental car reservation search 180. The actual search and presentation of the search results are not described in the context of this figure.

If the evaluation for a rental car reservation search request is negative, then the next step is to end 190 processing. This aspect of the system's behavior can effect the user's perception how the system terminates processing of captured user action. In an embodiment, the system is entirely silent in the case where a user action will not launch a search. This avoids annoying the user. Alternately, in a search system on which the user feels reliant, the user may want reassurance that the system is continuing to process their actions and would provide search results if any were available. In such a system, a visual indicator of some type could be used to indicate that a user action has been captured, processed, and no further action will be taken. On a Microsoft Windows-based computer, for example, this could be accomplished by an animated icon in the "Taskbar" or in an Internet Explorer "toolbar."

Note that this decision flow 100 contains several implicit assumptions which may not be true for all systems. In particular, it assumes that only one type of travel search will be launched in response to a particular user action. This need not be the case. A system may be constructed to launch multiple types of searches in parallel, allowing the user to selectively view the results of each type of search. Or, a system could be constructed that presented travel packages, either by launching a search of travel-package suppliers or by launching searches for multiple travel package components and then aggregating the results into packages presented to the user.

Another assumption built into this flow is that it is higher priority to perform an air travel search over hotel or rental car searches. This assumption may not be valid for some types of systems. Additionally, the decision flow could be adapted to incorporate further information to alter the relative preferences between the different types of travel information searches available. Examples of such information include information about the user's prior behavior or preferences, or about the source from which the user action was captured, whether that source was a software component on the user's (client) computer, an explicit interaction between the user and the search system, or a third-party web site.

Clearly, the decision flow 100 could be extended with decision blocks for other types of travel reservations not shown in this example. Additionally, the entire flow could be adapted to an alternate set of information categories unrelated to travel reservations.

Figure 1B:
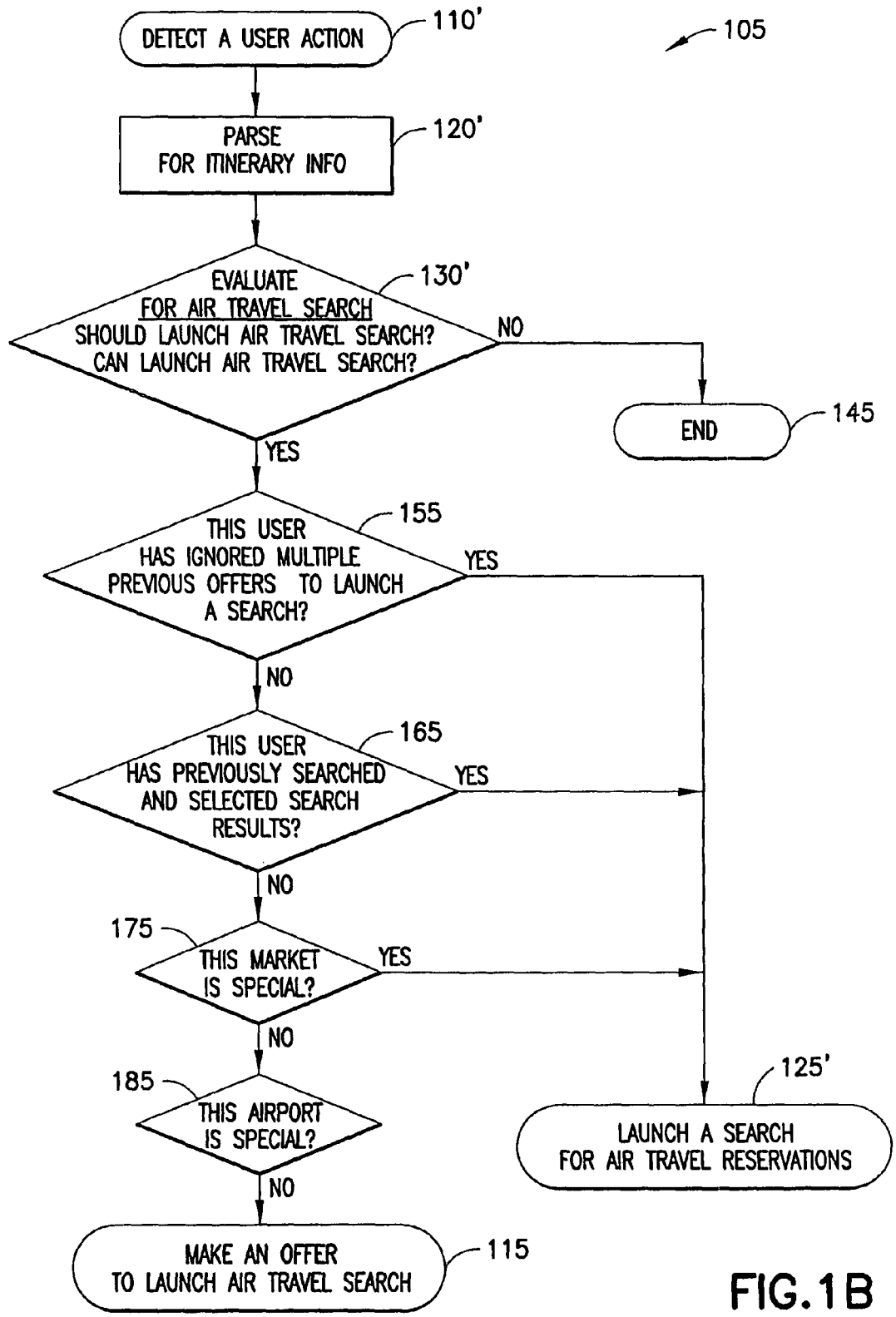
FIG. 1B is a flow diagram of the decision to offer to launch a search or automatically launch a search for airline reservation information in an embodiment.

FIG. 1B is a flow diagram 105 of the decision to offer to launch a search or to automatically launch a search for airline reservation information in an embodiment. While FIG. 1A is an example of a system that (when applicable) always offers to perform an air travel reservation search and never automatically performs such a search, this flow diagram 105 is an example of a system that attempts to make a more sophisticated decision as to when it would be appropriate to automatically perform an air travel reservation search. This method of making an automatic search decision could be integrated into the flow illustrated in FIG. 1A to provide for multiple types of travel reservation search, and could be adapted for information types other than air travel reservations.

The operation starts with the detection of a user action 110', parsing 120' itinerary information from the information captured with the user action, and evaluating for an air travel search 130'.

If the evaluation for an air travel search request is negative, processing ends 145 or proceeds to steps outside the scope of this figure. If the evaluation is positive, the process moves to a set of decisions intended to determine whether to do a search 125 unconditionally (automatically) or if the system should offer to launch a search 115 to the user.

The next step is to test whether the current user has turned down or ignored previous offers to perform a search a number of times 155. The particular number of times a system may test for, and what behavior occurs on potential automatic searches beyond the first one after that number is reached may be tuned to a particular system and to its customers' profiles and observed behavior. To accomplish this test, the system must maintain user-specific historical information that can be accessed during the determination whether to automatically launch a search. The intention of this test is to demonstrate the system's capabilities to users who are reticent to accept the offer to perform a search, but who may actually benefit from the search system once they understand its capabilities. The test may be more finely tuned by taking into account information about whether they have been presented search results for other information types in addition to air travel reservations.

The next step is to test whether the current user has both previously accepted the system's offer to perform a search and previously selected a result returned by the search system. As with the previous test 155, to perform this test 165 the system must record prior user behavior and be able to correlate it with the current captured user action. The intent of this test is to save users who have previously demonstrated an interest in using the system from having to perform the "extra" step of accepting the system's offer to perform a search.

The next step is to test the market 175 (origin and destination airport pair) identified by the current itinerary to determine if it is more likely than most to yield desirable search results. For example, some markets are served by carriers that have predominantly lower fares (assumed to be more desirable than higher fares), such as the so-called big-discount airlines like JetBlue, AirTran, ATA, and Southwest. In order to perform this test, the system must be capable of performing the early portions of the pruning process, processing from an itinerary to a list of carriers to search, prior to having made the decision to actually perform a search. Once the list of carriers is derived, it can be compared against a list of "special" carriers, either low-fare carriers as already mentioned, or carriers with which the search system operator has a preferential business relation, and/or against a user-specific carrier list (such as the list of airlines the current user has repeatedly purchased from, often called "brand preference," and/or to whose frequent-flyer program the user belongs).

The next step is to test the origin and destination airports 185. This is a similar test to the above, but allows the system to give preferential, possibly transitory, treatment to particular airports. Depending on the particular behavior desired, it may be necessary for the system to perform the mapping from a city name in the itinerary to (possibly multiple) airport codes. Clearly, any number of test criteria could be added to or removed from this decision process to accomplish specific goals for the system's behavior with particular user actions. In a typical system, this level of detailed decision will be frequently and continually updated to tune the system's behavior. As such, it is beneficial to implement the system, and especially portions that could benefit from frequent updates, using a modular software technology. For example, using the Java programming language to implement the decision flow and a standardized software object interface for each individual test would allow individual tests to be added and removed from the system "live", while it is in operation without any disruption of service.

Figure 2:
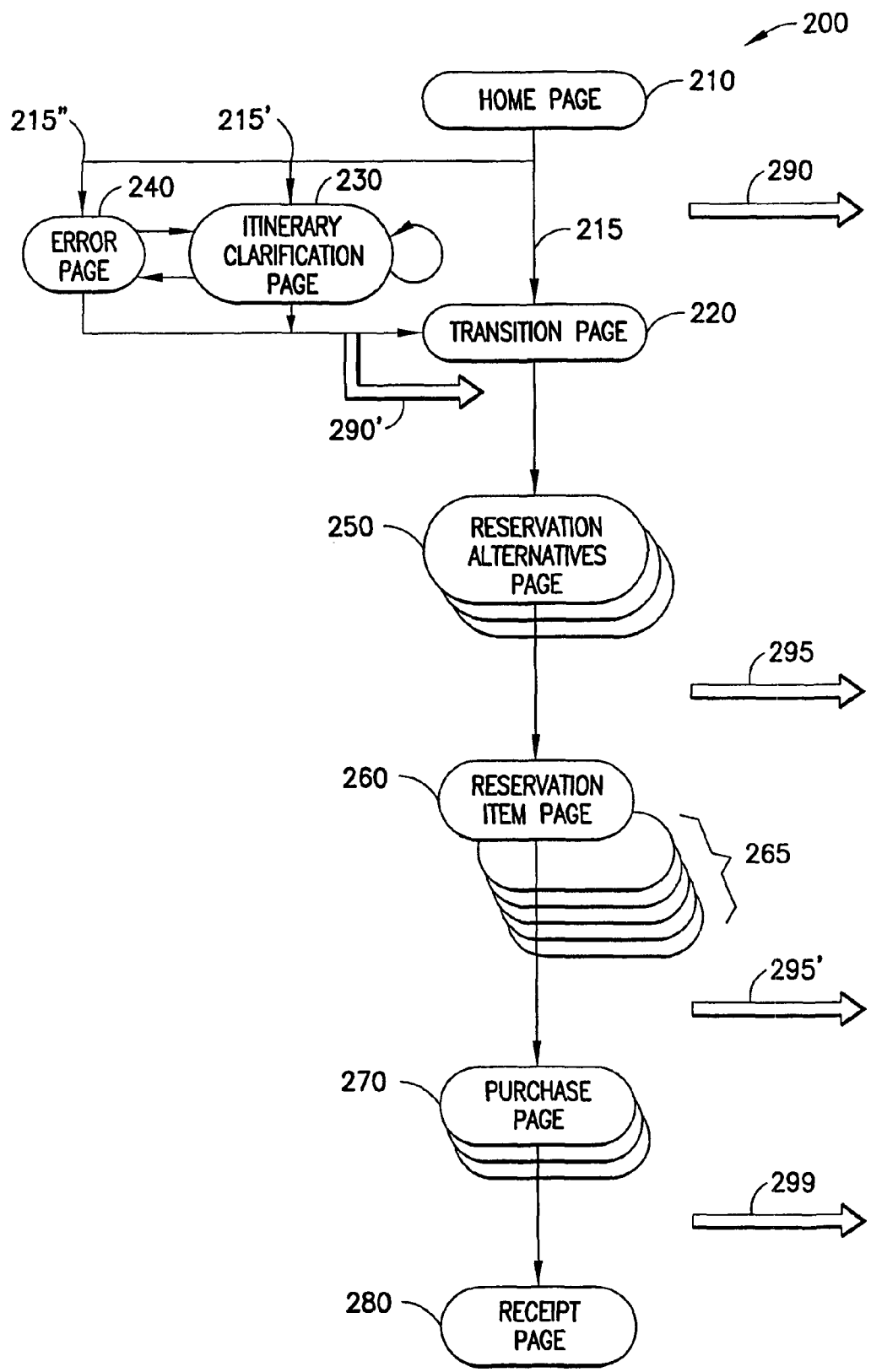
FIG. 2 is a flow diagram of a user session with a third-party web site indicating the points at which an implicit search query may be captured and a search launched in an embodiment.

FIG. 2 is a flow diagram 200 of a user session with a third-party web site indicating the points at which an implicit search query may be captured and a search launched in an embodiment. In this flow diagram, which represents an archetypical travel-agency web site, each bubble represents a web page of content transmitted from the web site server to the user's web browser. Each vertical arrow linking one bubble to the next indicates the navigation path (or sequence of pages) that may be followed by a user in a session with the web site. Each horizontal arrow leading away from a bubble indicates the possible capture of a user action for processing by the system.

Typically, a session will begin with the web site's home page 210. Many travel agency web sites, in addition to explanatory text, advertisements, links to corporate information and policies and so on, have an itinerary entry form. For this example, the portions of the travel agency's site that are not involved with actually finding and purchasing travel reservations will be ignored. Some web sites use forms spread over multiple pages to collect all of the necessary itinerary information. For this example, it is assumed that all itinerary information is entered on one page. After the user enters itinerary information, they will select a control that causes their browser to transmit that information to the web site's server. Ignoring error conditions (discussed below), this will take them to the next page.

Most travel agency sites take long enough to perform a search that they display a transition page 220 whose purpose is to inform the user that their request has been received, is being processed, and the site will "get back to them" as soon as possible. Typically the operation of the web site will generate browser navigation requests that cause this page to be replaced with the next.

After the transition page 220 a travel agency web site will usually display a reservation alternatives page 250 for the user's desired itinerary. On some sites, this page may be the first of several, although the flow between pages for this possibility is not illustrated in the figure. The mechanisms used to display the reservation alternatives vary widely, but the most common interface design is to require that the user select a particular one of the alternatives presented. This selection causes a new request to the web server, and a new page to be displayed.

The next page displayed is the reservation item page 260, containing description information and selection controls for the particular reservation alternative the user selected in the previous page. The actual reservation item page 260 viewed is typically one of a set of different reservation item pages 265 that may be accessed from the reservation alternatives page 250. From this page, the user will typically be given the alternatives of purchasing the reservation detailed on the reservation item page 260 or returning to the reservation alternatives page 250.

When the user elects to actually make a reservation, they will be taken to a purchase page 270. This may be a single page as shown in this example, or multiple pages in a sequence or "funnel" used to complete the process of collecting payment information from the user and confirming their purchase.

Finally, most web sites will display a receipt page 280 at the completion of a purchase transaction. While the user may continue to interact with the web site, further interactions can generally be considered to be the start of a new session.

It is also common for the user to provide erroneous, incomplete, or ambiguous itinerary information. In the former cases, the user will typically be shown an error page

240. Ideally, this will explain the problem to the user, give them an opportunity to correct their input, and then continue on to the transition page 220.

In the case of ambiguous itinerary information, the user will often be presented with an itinerary clarification page 230. On this page, the web site will present the different possible interpretations for itinerary information the user gave. For example, if the user provided the city name "Moscow" with no additional information, the site may present a page asking the user to select between "Moscow, Id." and "Moscow, Russia". After making one of these selections, the user can be taken to the transition page 220.

In this example session, the first opportunity for the search system to automatically launch a search occurs when the itinerary entry form is complete and the user action to submit the form on the home page 210 occurs. In an embodiment the search system detects the user action through monitoring and capturing navigation requests as they are sent to the web site's server, represented by the navigation arrows 215, 215' and 215" leaving the home page 210 bubble. (Note that these three arrows all represent a single request. It is only after the web site's server receives and processes the request that it is differentiated into the different possible responses the server can generate.)

In this example, the search system uses this first opportunity to possibly launch a comparison search 290. In this case, the search system may launch a broad search for many different alternatives to present in parallel with the results displayed by the travel agency web site in the reservation alternatives page 250. Note that, unlike the web site, if the itinerary information is erroneous or incomplete, the search system would do nothing at all and remain silent.

The next opportunity to automatically launch a search would occur after the user interacts with an itinerary clarification page 230. Like the first opportunity, the search system may launch a comparison search 290'. This case is separate from the original comparison search 290, because of the different ways in which the travel agency web site may be architected. It is possible that the web site uses the same basic HTTP request format for navigation requests generated by both the home page 210 and the itinerary clarification page 230, in which case the same itinerary parser could be used for both request sources. In fact, it might be difficult or impossible for the search system to distinguish between requests originating from the two different pages. However, it is also possible that the two requests are completely different and that even though the goals of comparison searches 290 and 290' are identical, they require entirely separate itinerary parsers within the search system.

Later in the user session, the search system has the opportunity to react to the user's selection of a specific reservation item, which generates the navigation request that takes the session from the reservation alternatives page 250 to the reservation item page 260. In this example, if an automatic search is launched at this point it will be a more narrow, focused selective search 295. The intention of a search like this is to find items that are a direct alternative to the item the user selected, and if the search is launched it will likely use very different pruning parameters to choose the information sources searched, as described above.

Another opportunity at which the system may launch a selective search 295' is as the user leaves the reservation item page 260 for the purchase page 270. The determination of whether the system should search at this point or the preceding one can be a subtle matter of user expectation and type of search behavior desired. For example, the user likely has a stronger commitment to purchase a particular reservation when leaving the reservation item page 260 than when entering it. Whether this indicates that the search might better be launched earlier (because a less committed buyer might be more likely to choose an alternative the search system offers) or later (because a more committed purchaser could be a more valuable customer to a competitor) would depend on exactly how the search system and its underlying business is optimized and tuned.

The final type of automatically-launched search shown in this example is the complementary search 299. This type of search would be launched late in the user's session, and would be intended to find items that would "go with" what the user has selected to purchase. For example, if the user has purchased an airline reservation, the search system could launch a search for hotel reservations or for rental car reservations in the destination city.

Figure 3:
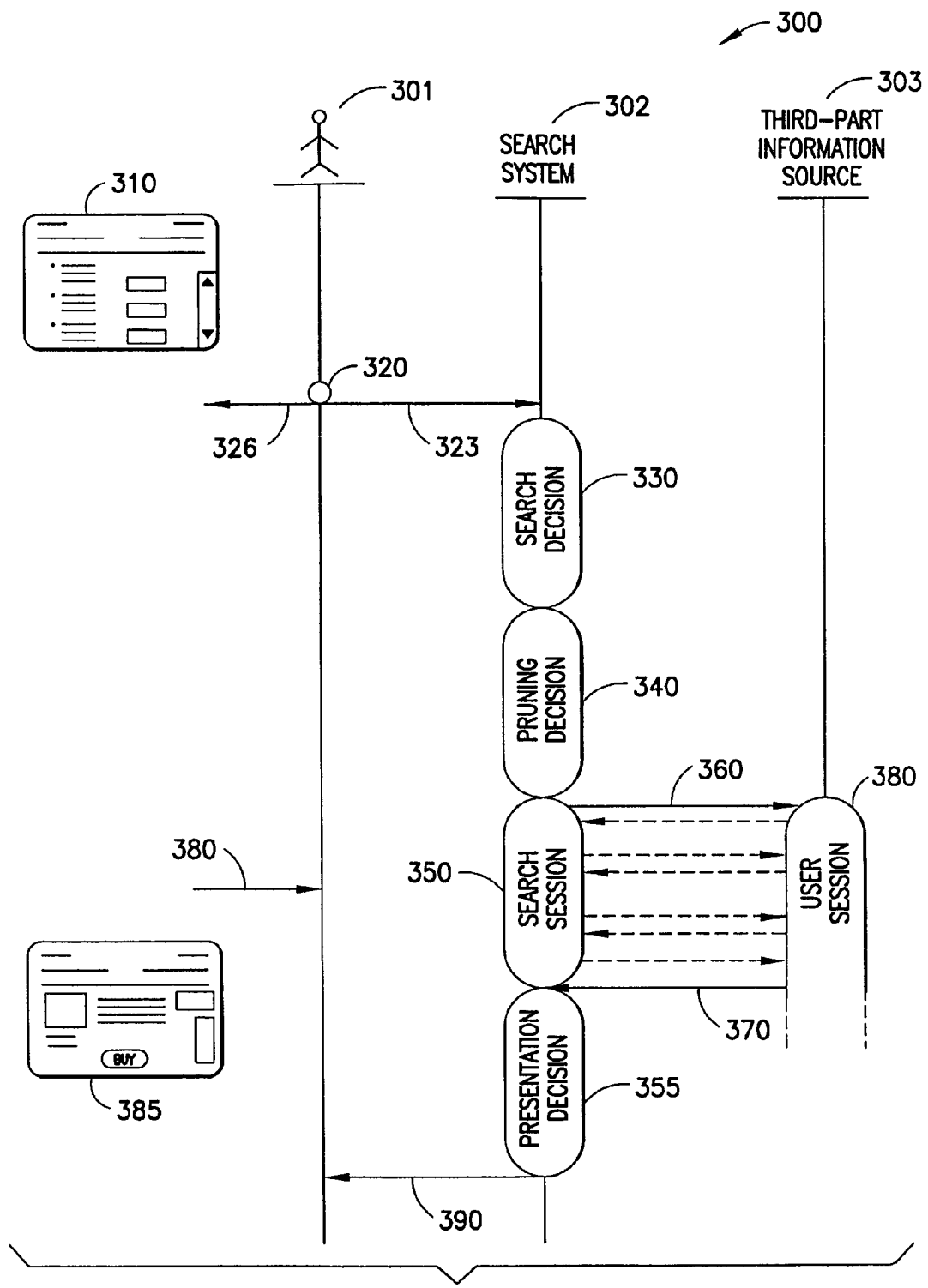
FIG. 3 is a transaction diagram of the exchanges between a user, search system, and third-party information sources during a specific search for hotel reservation information in an embodiment.

FIG. 3 is a transaction diagram 300 of the exchanges between a user 301, a search system 302, and third-party information sources 303 during a specific search for hotel reservation information in an embodiment. Each of the three actors in this diagram are represented as a column (all the third-party information sources are aggregated into a single archetypal column), with time represented by the vertical axis of the figure. The arrows between columns indicate communication transmissions from one of the actors to another. At the far left are shown wireframes of the pages displayed on the user's browser with which the user is interacting. These pages can be matched to those shown in FIG. 2 if that flow diagram 200 is further qualified by the assumptions that the travel agency web site provides hotel reservations and that this is what the user is attempting to find and purchase.

This example begins after the reservation alternatives page 250 has been displayed to the user 301. After consideration, the user selects 320 one of the items listed on the page. This causes the user's browser to transmit a request 326 to the travel agency web site. Although there are other mechanisms that could produce the same results, in an embodiment, the request is detected by a Browser Helper Object within the user's web browser, which captures the information in the request, and creates a possible itinerary message 323 to the search system servers. Note that, in order to provide the search system with the information to make the decisions of this example, the Browser Helper Object may need to capture information from within a web page in addition to information included in navigation requests originating from that page.

In response to the possible itinerary message 323, the search system makes the automatic search decision 330 and then makes the pruning decision 340. Note that in an embodiment, the search system maintains a per-user configuration setting through which the user may select not to have automatic searches performed on their behalf. If this option were selected by the user, the automatic search decision 330 would always choose not to automatically search, regardless of other factors.

Recall that this is an example of a selective search, in which the goal is either to find a reservation for the same hotel room(s) the user selected (through an alternate source that provides a better price, an upgrade to a superior room, frequent flier miles or other types of perks, etc.) or to find a superior room for the same or a lower price. To accomplish this goal, a very different (and likely shorter) list of information sources would be produced by the pruning process than would have been produced for a broader search. In particular, the list will contain all available sources that are capable of returning a reservation for the particular hotel room selected by the user. In a more general hotel search, redundant sources may well be pruned out, leaving in only the single most-preferred possible reservation source for each property.

Having generated a list of information sources to search, the search system processes search sessions with each one, typically in parallel. Each search session starts with an information request 360 from the search system and ends with an information response 370. Depending on the architecture of the information source, several request/response transactions may be necessary before all of the desired information has been gathered.

After receiving results from the selected information sources, the search system must make the presentation decision 355. This can also be described as "post-search" or result pruning. For broader searches in which many results will be returned to the user, it is possible to present results to the user as they are received. For a specific search, in which the search system is effectively competing with a decision the user has already made, it may be desirable to present a single, focused result. In choosing this result, a set of rules such as the following example may be used:

If the same item as the user selected is found for a lower price, that result is presented. If more than one lower-priced result is found, then the lowest-price result is presented.

If the same item is found at the same price, but is found through a "direct" information source (such as the reservation web site of the particular hotel or hotel chain chose) and the user's existing selection is through an intermediary (such as a travel agency web site), the same-priced alternative is presented.

If a lower price for the item selected by the user is not found, present any "superior" item/price combinations found. The criteria for "superior" would depend on the exact goals of the system and may depend on explicit or implicit preference information about the user, but for hotels would likely include room reservations at a more highly rated hotel for a similar (lower or only slightly higher) price, a similar nearby room for a lower price, etc.

If none of these conditions are met by the results received, the search system remains silent and does not make a presentation to the user.

After the presentation decision 355, the search system may present to the user 390. Depending on the timing of the relative systems, the reservation item page 385 from the original web site may be displayed before or after the search system's results are provided (see, e.g., 380). In an embodiment, the search system's results are displayed to the user in a subwindow of the user's web browser. In the case of an automatically launched search or the system offering to launch a search, this subwindow may be automatically opened if it is not already. If the subwindow is closed when the search system decides to present a selective search result, it may be automatically opened. If it is already open, however, there is the possibility that the subwindow may contain earlier and still-valid search results that the user is still interested in. As these results will be replaced by the result of the automatically-launched selective search, the system can provide the user a mechanism to return to the previously-displayed results.

Figure 4A:
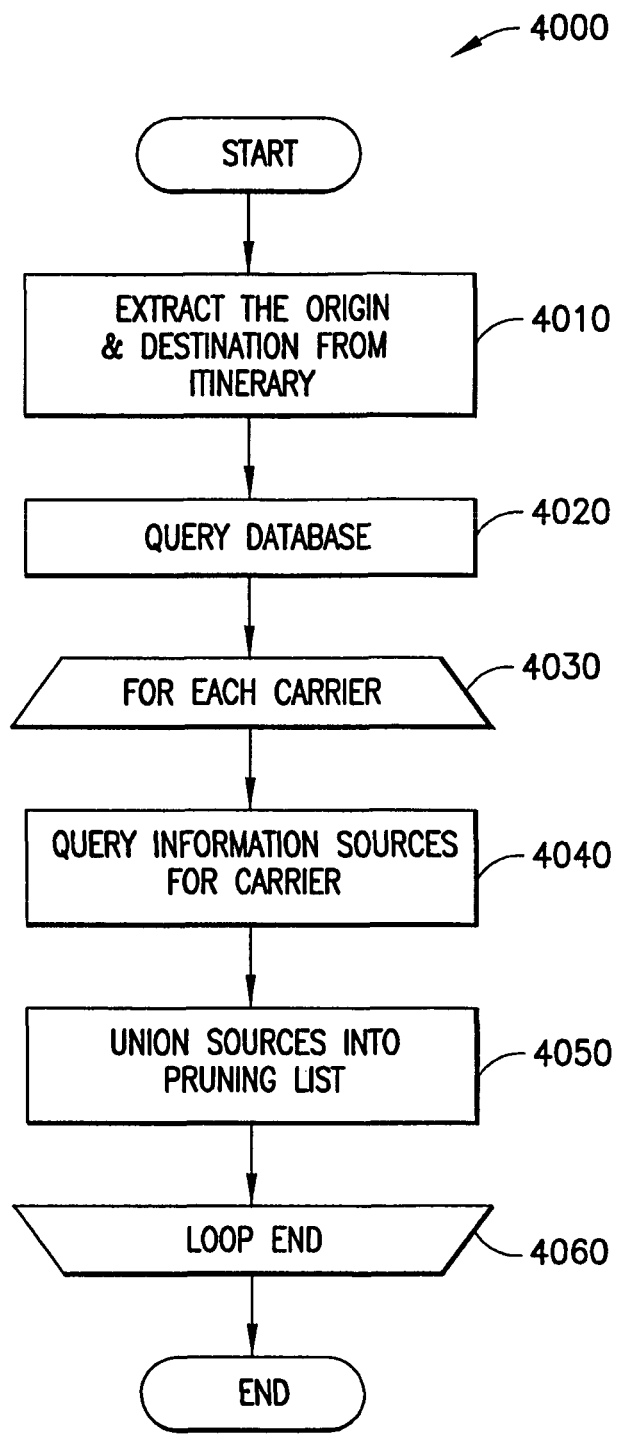
FIG. 4A is a flow diagram of a minimal pruning process for airline reservation-specific searches of an embodiment.

FIG. 4A is a flow diagram 400 of a minimal pruning process for airline reservation-specific searches of an embodiment. This process requires only a data set defining the availability of flights for particular markets and carriers. A fairly extensive database, more than is required to support this process, can be constructed from publicly-available information, such as that published by OAG. To support this process, the database merely need contain one record for each market (origin/destination pair) that lists all of the carriers that provide flights in that market.

In this example, pruning begins by extracting the origin and destination 4010 from the itinerary information. In this minimal case, it is assumed that any carrier that serves the market from one airport to another will also serve the market in the opposite direction. How support for three-point or more travel itineraries impacts this process depends on the system's overall approach to them. In particular, if the system is designed to provide reservations on only a single carrier for multi-point itineraries, then this entire process must be repeated for each market that makes up the itinerary and then an intersection of the resulting carrier lists created. Alternately, if there are no restrictions on the carriers for each particular leg of an itinerary, then the union of all of the carriers serving each market in the itinerary may be taken.

The next step is to query the database 4020 for the market from the itinerary, retrieving a list of at least one carrier that serves the market.

Having obtained a list of desired carriers, that list has to be mapped to a list of information sources to be searched. To accomplish this mapping, another database may be used which contains a record for each carrier listing the information source(s) that may return reservation information for that carrier. For each 4030 carrier in the list, the system queries the information sources 4040 for that carrier.

In another embodiment, more detailed mapping information may be represented directly in the database that associates markets with carriers. For example, instead of having a record in the database for each carrier that serves a market, there could be multiple records, each with a unique combination of origin, destination, carrier and supplier.

Each information source that is found is "Unioned" Information Sources 4050 into the growing Pruning List. That is to say, the list is checked for that particular information source, and if the source is not present on the list then it is added. Note that at this level of operation, "information source" is a relatively abstract term. For example, a web site that has different search capabilities or multiple levels of depth, as described above, may best be represented within the system as multiple logical information sources. In these cases, each of the logical information sources may be listed separately within the same record of this database.

At the end of the loop 4060, the Pruning List is ready to be used for launching search sessions with each chosen information source.

Note that the set of carriers serving a particular market changes from time to time, a fact that is not explicitly provided for in the pruning method 400. This can be accommodated in at least two ways. First, the data that is processed to create the list of carriers for each market can be reprocessed, for example, once a day, using only flights that are available on that day and ignoring any other listed flight that has already ceased service or has not yet started. This leads to the smallest correct set of carriers being generated. However, it means that, for users searching for flights in the intermediate future, the search system may not search all of the carriers actually expected to be flying on the user's travel date. A more conservative method is to reprocess the publicly-available flight data each time an updated version is made available, and to process it completely ignoring the validity dates associated with each listed flight. This will generate a list of carriers for each market that is the union of current and planned service, and while it may lead to some searches being executed that cannot possibly return results, this may be generally preferable to failing to find available reservation information.

It is possible to increase the complexity and potential precision of results of this flow in several ways. First, the system can track "point of purchase" restrictions. Many airlines and merchants place restrictions on the reservations a user may purchase based on where that user lives or is making the purchase from. If the search system has access to the user's "home" information (perhaps supplied directly by the user or obtained from a system that tracks locality of internet users), then it can make use of market and supplier information that is annotated with point of purchase restrictions. Some times when there are multiple information sources that can supply information for the same carrier and market (more information on this possibility below), one of the information sources will impose point of purchase restrictions different from the other, or (e.g., due to supplier pricing policies) will reliably provide better-priced results if its point of purchase restrictions are satisfied. In cases such as these, home information for a user can be used to make significant improvements in the pruning that occurs when mapping the pruned list of carriers into a list of information sources to search.

Second, the system can differentiate service of a given market that is supplied by a single carrier from service that is a "code share" or "interline." Code shares are flight legs (a single takeoff and landing pair) that are serviced by a single physical aircraft but reservations are sold on that aircraft by multiple carriers under different flight numbers. "Interline" is the technical name for a market served by flight legs that make a connection where one leg is a flight on one carrier and the second leg is a flight on another carrier, but the user is able to purchase a single ticket for the market from one or both of the carriers.

In the case of both code shares and interlines, some carriers' captive web sites and some travel agencies and merchants do not sell them in the same way (or with the same pricing) that they do single-carrier markets. By annotating a particular carrier's entry for this type of market to indicate the special nature of the service, those information sources that do not return these types of reservation results or that reliably return higher priced reservations in their results can be pruned out of the list of information sources to be searched.

There are many ways in which the necessary information can be gathered for inclusion in the database that contains the information used during pruning. While the details and trade-offs differ, the types of available methods are basically the same whether the database is to be used for airline reservation, hotel/lodging reservation, or rental car reservation search pruning. The first method is to simply gather the data "by hand." This need not entail a visit or phone call to (for example) every hotel property in the world to create the hotel pruning database. Instead, the operators of the search system can request from each supplier organization (airline, hotel chain, etc.) that they be provided with information sufficient to create the pruning database. There are several ways in which a purely manual approach like this may be problematic. First, the supplier organizations may not want to share their information, and therefore not provide it at all. Second, when supplied the data may well be in radically different formats from each supplier contacted. This creates a condition where a significant amount of effort must be expended per-supplier in parsing or translating their data format into the pruning database. Next, a supplier organization that doesn't perform such data transfers as a regular part of its business will often lack the internal procedures necessary to ensure that the data provided is accurate and timely.

Another alternative is to create a small information search system in parallel with the primary search system. Such a small system could periodically access and interrogate the systems of information suppliers (such as, for example, a rental car chain's reservation web site) to obtain the information necessary to construct the pruning database. This system would likely have to have an "adapter" mechanism tailored to this type of data retrieval (as opposed to the searches normally performed) and to each information supplier that will be accessed in this way. The suitability of this approach may vary widely based on the type of information desired. For example, it would be very difficult to attempt to determine all of the markets served by a particular carrier in this way, both because typical airline web sites require a separate search for each desired market (making a series of searches for all possible markets very expensive in bandwidth and computation) and because changes in the availability of flights may mask routes that are really served. Trying to determine when routes are introduced or eliminated through this method (perhaps by not only doing a search on every possible market, but for every day far into the future as well) would clearly be prohibitive.

At the other end of the spectrum, many rental car chains can be assumed to have outlets at every major airport and have pages on their web sites with complete listings of their off-airport locations in a city or a state all in a single place. Assuming that they contain all of the types of information necessary for the constructing the pruning database, pages like this makes such rental car supplier web sites very amenable to being searched for the information necessary for future pruning (although the pages used will typically be separate from those used to search for particular reservation information), especially since the opening or closing of a rental site is very infrequent. The web sites of most hotel chains lie somewhere in the middle, between these two extremes of suitability for searching for information to construct the property database.

Another potential source of information for pruning databases are the so-called Global Distribution Service (GDS) companies, who have historically served as the central point for travel reservation management between suppliers (airlines, etc.) and bookers of reservations (travel agents rather than consumers). As with directly accessing a supplier's web site, the results from searching a GDS can be muddied by the changing availability of reservations on a particular flight or in a particular hotel. However, it can be technically easier to connect to a GDS than to a sufficient number of Internet web sites to provide comparable data.

Finally, there are existing companies that act as brokers in this type of information. In particular, OAG provides extensive information on airline routes and flights on a paid subscription basis, which can be used to provide much of the data required to build a specific pruning database for a specific airline reservation search system implementation. Other companies and organizations also provide different types of information suitable for use in creating the different pruning databases presented here.

In the particular case of maintaining the database used for airline pruning, even maintaining a database associating markets and carriers is virtually impossible to accomplish using a manual or partially-manual process. One reason for this is the vast number of flights that have to be handled. Another reason is that airline flight schedules are altered on a regular basis, requiring that the pruning database be updated very frequently with new information reflecting cancelled flights (which may mean that a market is no longer served by a carrier, and therefore searches of that carrier for that market should be pruned out) and added flights (which may mean that a market is served by a new carrier and that valuable flight options are not being found and presented to the user because the pruning prevented the carrier from being searched).

In an embodiment, the airline pruning database can be generated entirely from data available publicly and by fee/subscription. Because this data is frequently redistributed and typically does not include an meta-data indicating the presence of changes, the pruning database may be regenerated from the most-recently received data frequently and unconditionally.

Figure 4B:
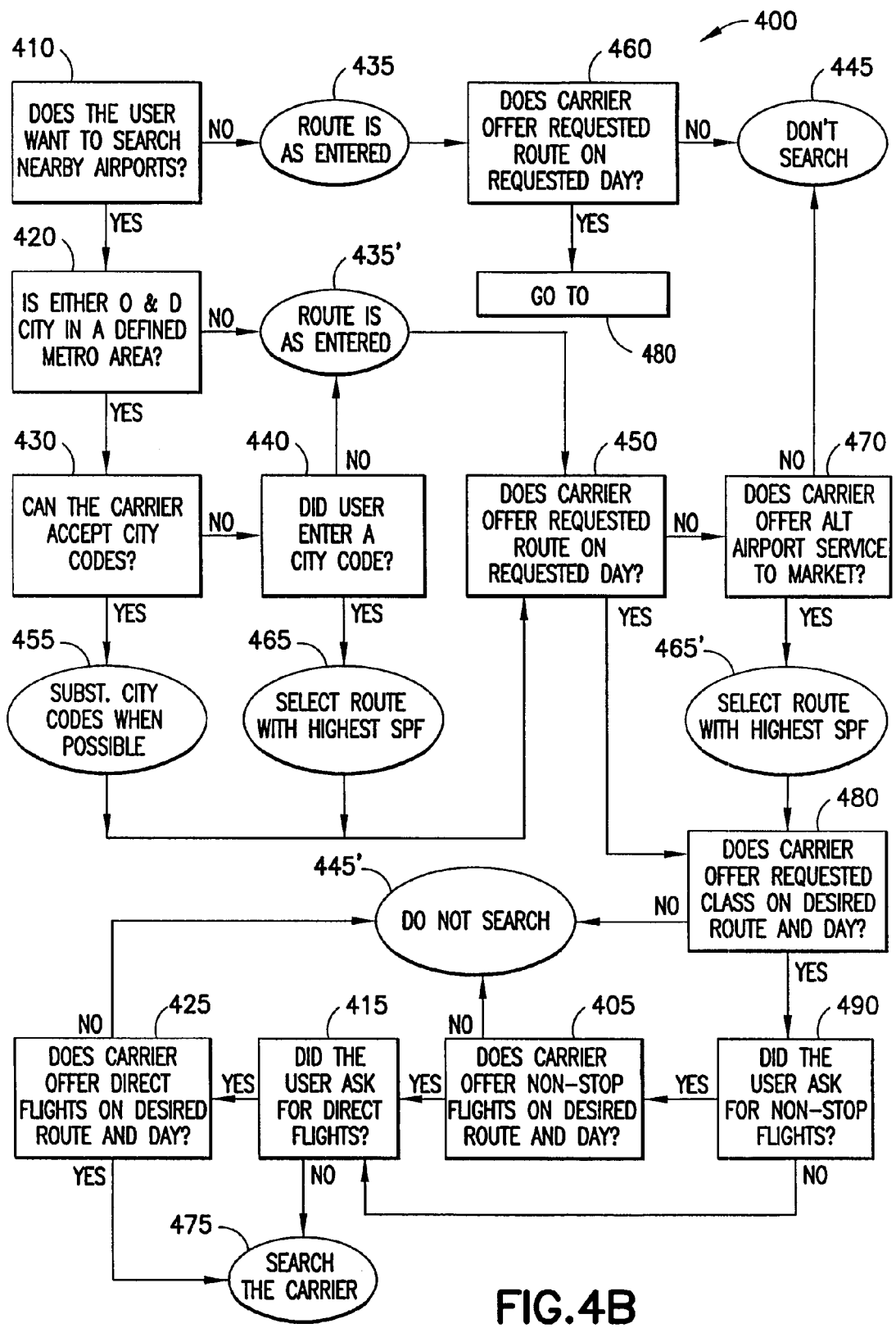
FIG. 4B is a flow diagram of an alternate pruning process for airline reservation-specific searches of an embodiment.

FIG. 4B is a flow diagram 400 of an alternate pruning process for airline reservation-specific searches of an embodiment. As shown, this process is intended to be applied once for each carrier that is available. It is presented this way for clarity. As an optimization the results of the first few decisions (which are independent of carrier) could be cached. It may be executed following or instead of a more simplistic pruning method that uses only a listing of the carriers that serve each possible market in any way.

Processing begins in step 410, where a user configuration option is evaluated to determine if the system should search for airports near the origin and destination specified by the user, or if the user's input should be used literally.

If the user permits broadening of the search to nearby airports, the next step 420 is to check to determine if either or both of the airports specified reside in a "metro area" (an area containing multiple nearby airports). If neither airport is in a metro area, then the itinerary will not be modified and processing continues in step 450.

If the airport is in a metro area, the system determines in step 430 whether the carrier/source combination to be searched can accept a city code and perform a check for multiple nearby airports on its own. If it is capable of this, then, for searching the current carrier/source, the specified airport code will be replaced by a corresponding city code prior to proceeding to step 450.

After step 410, if the user has chosen to search only the specified airports, then the itinerary remains unchanged and the system proceeds to step 460. At this point, the system's database of flight information is interrogated for the current origin and destination pair and the current carrier. (Note that in the case of a search for multi-point itinerary (e.g., intentional stop-overs at one or more airports between the initial origin and final destination), this and other pruning processes have to be repeated for each leg of the itinerary.) The results returned are examined to determine if the current carrier has one or more flights (routes) between the origin and destination on the desired travel day(s). If the carrier does not serve the desired market on the desired day(s), this carrier is pruned from the search and will not be searched. Otherwise, the carrier will be searched and the process continues with step 480.

Step 440 is responsible for handling the case in which the carrier/source combination cannot search from a city code. If the user provided airport codes, then the itinerary may remain unmodified and the process can continue with step 450. However, if the user provided a city code (and we already have determined that the carrier/source cannot search using it), then the search system must map the city code to one or more airport codes. This is done by choosing the airport(s) within the selected city that create the most preferred markets (origin/destination pair) when combined with the other information from the itinerary.

Market preference is represented in the figure by striving for the highest "SPF" or Supplier Priority Factor. The SPF is a numeric aggregate of the various preference information the system may have available for the supplier (including user-specific preference information), as well as preference information for the particular market, potentially based both on the types of preference factors described above as well as on such things as whether that market is served by nonstop, direct, or connecting flights.

In step 450 the database of flight information is queried to determine if the current carrier provides service in the desired market(s) on the dates listed in the itinerary. If service is available on the desired dates, processing continues with step 480. Otherwise, the sequence continues to step 470.

After discovering that the carrier doesn't provide service to the desired market(s) on the desired dates, in step 470 a further database query is performed to discover service the carrier may provide, on the desired days, to alternate airports or through alternate airline agreements (such as through a commuter service). If one or more substitute markets of this type are discovered, they replace the market(s) in the itinerary (for the current carrier only) and the process proceeds to step 480.

Like step 450, step 460 checks the database for the carrier's service of the market on the desired dates. However, since step 460 only occurs in the case the user has specifically requested that no airport substitutions be made, if the check fails then the carrier will not be searched (will be pruned out) and processing for the current carrier concludes. If the check passes, then the process proceeds with step 480.

The next checks performed are used to prune carriers out of the search if the user requested non-stop flights only 490 and the carrier doesn't provide them in this market 405, or if the user requested direct flights (or better) only 415 and the carrier doesn't provide them 425. If these checks pass (the service the carrier provides in the market meets the minimum levels specified by the user) then the carrier remains in the prune list and will be searched. If one of the checks fails, then the carrier will not be searched. Clearly, checks for additional user-provided criteria (e.g., smoking or non-smoking flights, minimum mean service, seating class preference, time of day, etc.) may be performed at this point in the process, provided that the database which the system has extracted from the public flight schedule information provides these values for comparison.

FIG. 5 is a flow diagram 500 of the loop used to apply hierarchical pruning rules during pruning for an airline reservation search of an embodiment. This type of pruning may be used either with a set of "global" pruning rules, as described earlier and drawn in this figure, or it may be used to post-process the output of an earlier, pruning mechanism such as that shown in FIG. 4A.

In this flow diagram processing is performed in a loop, with each level of the pruning rule hierarchy being handled by a single iteration through the loop, starting with the most general level. The hierarchy level being processed during any given pass through the loop is stored in the variable "currentHierarchyLevel". This flow diagram treats this variable abstractly, without being tied to a particular mechanism for encoding.

When the loop is started, the Pruning List is Initialized 510. If this pruning method is the only one in use, then initialization can be accomplished simply by emptying the list (if the global-level rules specify carriers to be added) or by filling the list with all available carriers (if the rules at the top level of the hierarchy specify carriers to be removed). If this pruning method is imposed on the output of an earlier one, then the existing contents of the list should be considered its initialization.

Prior to the processing loop, currentHierarchyLevel must be set 520 to a value that corresponds to the upper-most ("global") pruning rules. Unlike lower levels of the hierarchy, there is only a single rule set at the global level and it should match with all possible origin and destination points.

The next step is to compare the origin and destination 530 for the current itinerary with the definitions of the geographical areas associated with each primary pruning rule set in the current level of hierarchy. Note that this example process assumes that each area defined in one level of hierarchy is entirely contained within an area defined at the next-higher level. While this need not be the case in all systems, it may reduce the logic for explanatory purposes. Primary pruning rules are those that apply to markets where both the origin and destination reside in the same area.

If both ends of the current market reside within the same area, then the search system applies the rules 540 from the primary rule set associated with that area and advances to the "bottom" of the loop 560.

If the origin and destination for the current market lie within different areas, then a number of special rule sets will be applied. First, just as each possible origin and destination airport pair make up a unique market, so there may be a special pruning rule set associated with each unique pair of areas at a particular level of hierarchy. The system may have either one or two special rule sets for each pair, depending on whether the rule sets need to be "directional", that is to say different depending on which area contains the origin and which the destination. The rules in this special set will be applied to any market that links these two areas.

Each area may also have two special rule sets that are applied to markets that match that area, regardless of what other area is matched. One of these is the "outbound" rule set, which would be applied to any market in which the origin is in the area but the destination is not, and the other is the "inbound" rule set, or markets where the destination is within the area. After the special rule set that is particular to the area pair is applied to the Pruning List, the search system can apply the special outbound rules associated with the area containing the origin, and the special inbound rules associated with the area containing the destination.

After pruning rules have been applied (either primary or special), the flow reaches the "bottom" of the loop and determines 560 if the lowest level of the hierarchy has been processed. If it has, then this portion of pruning is complete and the flow ends 505. If there are remaining, lower levels of the hierarchy to be processed, then currentHierarchyLevel is set 570 to the next-lower value, and the loop repeats from the area comparison 530.

While this flow diagram 500 and its explanation have been given in terms of the pruning stage from the itinerary to the pruned list of carriers, this method can also be applied, instead or in addition, to the mapping of carriers to information sources. In this case, the hierarchy of rules would have essentially the same structure and continue to be matched against the itinerary's origin and destination. However, instead of containing rules of the form "add carrier X" and "remove carrier Y", each rule set would contain one or more carrier-specific (or carrier set-specific) rules specifying the information sources that should be added and removed from the pruned source list. For example, reservations for a single airline can often be found both through the airline's own web site (which, itself, may actually be represented within the system as multiple abstract information sources) and through a number of travel agency web sites. The information source pruning rules might contain a global rule (e.g., if the carrier list contains that airline, then always search the airline's own web site) while a set of lower-level, market- or area-specific rules could remove the information source for the "default" use of the airline's web site, add an "information source" that uses a search mechanism of the airline's web site with greater depth, and also add a travel agency web site.

In addition to a rule set containing rules that are specific to a particular carrier, it may be desirable to have rules that are applied based on a Boolean or mathematical operation over a set of carriers. For example, if a particular travel agency web site is known to provide reservation information for seven different airlines, it may be desirable to have a rule that says, in effect, "if four or more of these carriers [....] appear in the carrier list, add this travel agency web site and remove these other web sites [....]".

Note that a simplified version of this method may be employed for the hierarchical specification of pruning rules for lodging reservations, rental car reservations, other types of travel information, and other information generally. The difference is that these other types of searches are defined by a single point (typically the "destination" of a two-point itinerary), so that there need be only one primary rule set for each area and no special rule sets.

Applying these methods to non-travel search problems can be accomplished by generalizing the concept of a geographical area to any other possible partitioning of the search space (in one or more dimensions). As long as portions of the user query can be matched against the defined partitions to select a pruning rule set, this method is applicable. Note also that while these examples have been given for user queries with one and two (hotel/car and air, respectively) "partitionable" components (the geographic locations for origin and destination), such a pruning rule system could be created for user queries with any number of partitionable components. The number of rule sets in such higher-order systems would rise very quickly: In a system where the order of query components is significant, the number of secondary rule sets for inter-partition queries is the number of partitions raised to the power of the number of query components, plus the number of partitions times (at least) the number of query components (for the analog of the "inbound" and "outbound" rule sets).

Figure 6:
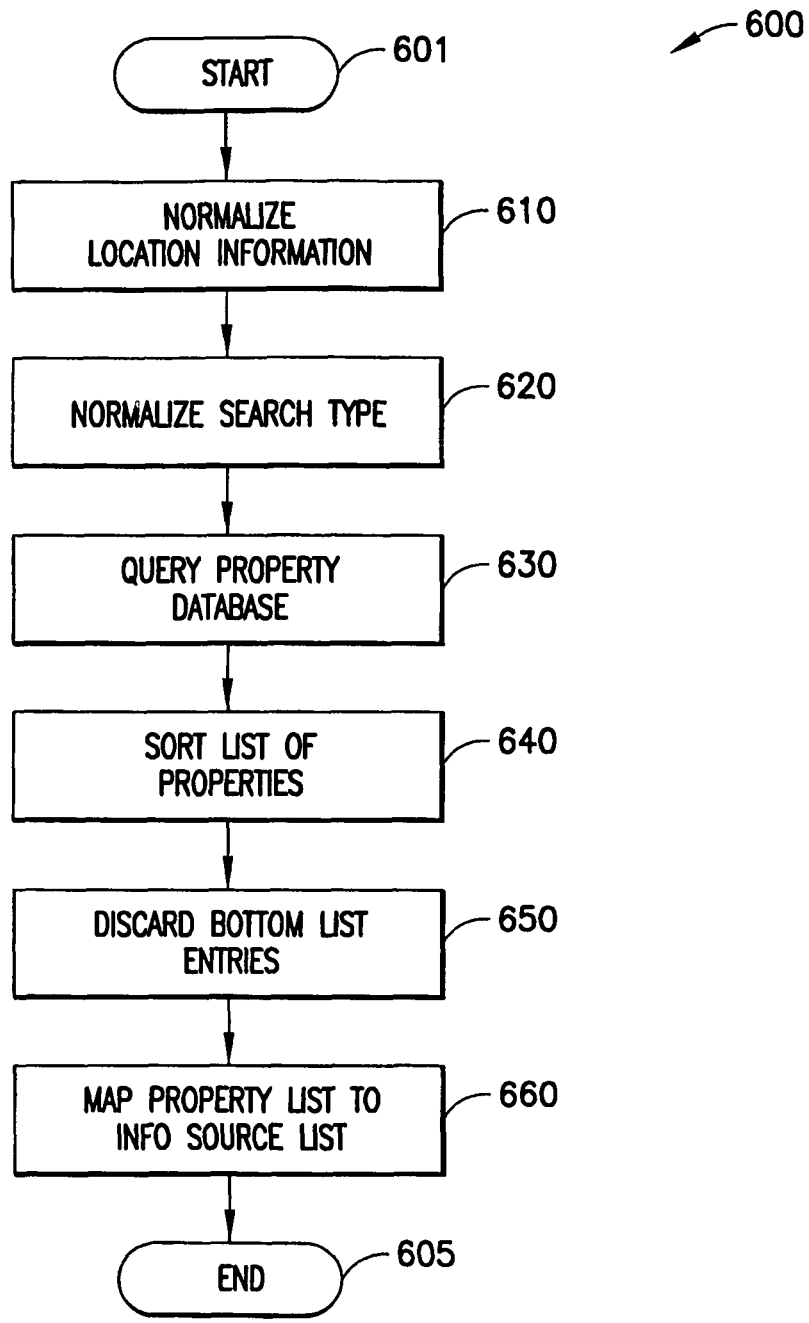
FIG. 6 is a flow diagram of a pruning process for hotel reservation-specific searches of an embodiment.

FIG. 6 is a flow diagram 600 of a pruning process for hotel reservation-specific searches of an embodiment.

Beginning with the location information from the itinerary, in this example the search system normalizes the location information 610 to the combination of a geographic coordinate and distance preference function. Geographic coordinates may be represented by longitude and latitude or by any other equally expressive mechanism. In one case, the distance preference can (for example) be an absolute radius, such as 30 miles, used to make a Boolean determination. Even these functions can be useful, and different radius values will typically be generated during normalization based on the source and purpose of the user query and itinerary. Potentially, the search system could have slightly different goals for its behavior for each different source of itineraries it supports.

A Boolean "distance" preference function might actually operate not on distance but on a comparison of the coordinates between a particular alternative (hotel property, rental car location, etc.) and the center of the search area. Such functions could be used to constrain the search to an integral number of city blocks around the block containing the center point, or to limit the search to actual, arbitrarily-shaped political or geographic boundaries.

In other embodiments, the preference function will be a true function, mapping distance from the center of the search area into a number or other comparable object. There are a number of ways that such a number could be used. For example: It could specify the fraction of the pruning list's entries that must be closer to the center point than the given distance. It could specify a maximum or minimum number of pruning list entries that may be returned having a smaller distance to the center. Or it could be an arbitrary preference value, presumably decreasing with distance, that would be aggregated with other preference values to ultimately sort and limit the number of items on the pruning list.

Especially in the case of lodging reservation searches, the system also normalizes the "type" of search 620. The search system may include a number of different sets of search pruning information, such as supplier or information-source preferences, that would be chosen depending on the source of the user's query and the system's goals in launching a search for that query. Another aspect of the search system's behavior that would depend on the search type is the mechanism that is used to query the initial, unpruned, property list from the system's database. While many searches begin with location information (hence the location normalization step, above), some may begin instead with a (partial) name of the desired hotel, or be qualified by a hotel chain.

The search system would then query its property database 630 for hotel properties matching the filter criteria. In the case of lodging reservation searches, there are several selection criteria that the user may provide (e.g., the minimum or maximum number of "stars" that a hotel should have in its rating to be considered, whether the user is interested in a "normal" hotel room, a suite, a vacation rental, etc.). These criteria should be incorporated into the database query (along with the fundamental selection criteria such as location, hotel name, or hotel chain), to so that the set of properties considered for pruning starts out being as appropriate to the user's query as possible.

Next the search system will sort the list of hotel properties 640 returned from the database. Depending on the system's sophistication and goals, this sorting can take into account a wide variety of factors, including (but not limited to) business- and user-oriented preferences, the distance preference function, (expected) reservation price, standardized mappings of hotel amenities to preference values, etc.

After sorting, the actual "pruning" takes place by discarding the bottom entries 650 from the list. Typically, this will be done to reduce the list to a "reasonable" size to be processed by the searching of external information sources and to be presented to the user through the search system's user interface. The number of items retained in the pruning list at this point will impact the trade off between providing the user with as broad a selection of results as possible and with providing them with a small enough set of results that reviewing them is feasible.

Then the system must map the property list 660 to a list of information sources that can be searched. As discussed in other examples above, this mapping may be done taking into account supplier-specific preferences, the possibility that multiple suppliers may return reservation information for the same property, and the possibility that the total number of information sources can be reduced by searching for multiple properties through a source that can supply reservations for all of them. And as discussed further above, the mapping from properties to suppliers could be done either by a database table dedicated to this purpose, or by adding supplier information to each record in the master property database, increasing the number of records for each property whose reservations may be returned from multiple information sources. This approach to storing the association between items that may be searched for and the information sources that may return results for such a source may be more appropriate for hotel property information than for airline information. In the case of airlines, an information source that returns information for flights of that airline in one market will likely also return information for all other flights of that airline. It is more common in the case of groups and chains of hotels for an information source that returns information for one property in a hotel chain to not necessarily return information about all properties in that chain. Therefore, storing information about possible information sources to search with each property may be more beneficial.

Figure 7:
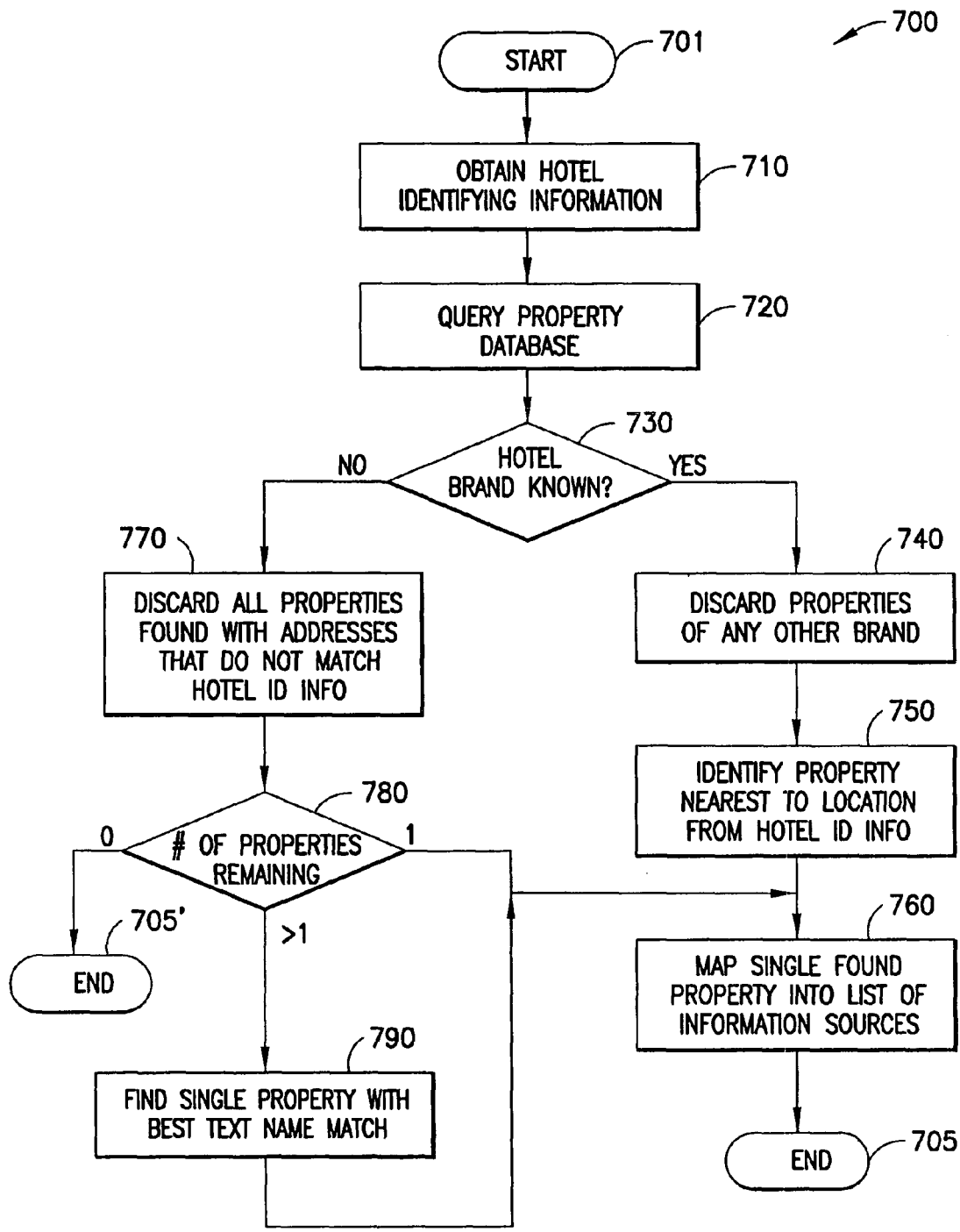
FIG. 7 is a flow diagram of a pruning process for a specific search for hotel reservation information in an implicit searching embodiment.

FIG. 7 is a flow diagram 700 of a pruning process for a specific search for hotel reservation information in an embodiment. In a specific search, the system's goal is to find reservation information for the specific hotel the user is requesting, either implicitly through a detected selection action on a third-party web site, or explicitly through directly providing information identifying the property.

First the system obtains the hotel's identifying information 710. In cases where the user is directly typing the name of a hotel, this may be done directly. In other cases, where the search system is attempting to respond to a user action that is simply the selection of an item from a list being presented by a third-party web site, it may be necessary to interrogate the contents of the web page containing the list and/or to accumulate information from web pages presented earlier in the user's session with the third-party site in order to have sufficient information to identify the hotel being selected. In addition, in order for the search system to make pruning and/or presentation decisions based on the comparison in price between the item selected by the user and search results found, the user's selected reservation price must be obtained along with the information identifying the hotel and the room reservation of interest to the user.

The system then queries its property database 720 to obtain the list of properties to prune, which in this case is the list of properties most likely to be "the" property desired by the user. Results of this query are limited in this example to only hotels found in the city that is part of the hotel's identifying information or hotels within a 30 mile radius of that city.

After obtaining a list of possible properties from the database, the search system checks if the desired hotel brand is "known" 730 in the system. This can be accomplished by preparing a table of hotel brands and the string comparison operations that can be used to identify them. Executing all defined comparisons on the desired hotel name may identify the user's desired brand/chain.

If the desired hotel's brand is known, discard properties of any other brand 740 from the pruning list. Then, examine the list to identify the property nearest to the location 750 from the desired hotel's identification information. Ideally, the closest property and the desired hotel will have matching geographic locations, whether compared directly through street address or indirectly through normalization to latitude/longitude.

Then, the system maps the single found property 760 into a prune list of one or more information sources and pruning is complete. Pruning processing ends 705 and the search system may launch the various external searches.

If the desired hotel's brand is unknown or cannot be identified, from the pruning list discard all properties with addresses that do not match 770 the desired hotel's identifying information. If, when this step is performed, no matching properties are in the list, processing ends 705' and no search is performed.

If exactly one property on the list matches the desired address, then the system maps the single found property 760 into a prune list.

If more than one property on the list matches the desired address, the system may attempt to find the single property 790 with the best text name match to the desired hotel. This can be accomplished by performing a "loose" comparison between the name of the desired property and the name of the properties remaining in the prune list. One loose-match method, for example, is to discard all of the words of three letters or less from each name string, then compare each remaining word of the desired name string with the words in the names of all of the candidate properties. The candidate with the largest number of word matches to the name of the desired hotel is chosen.

Figure 8:
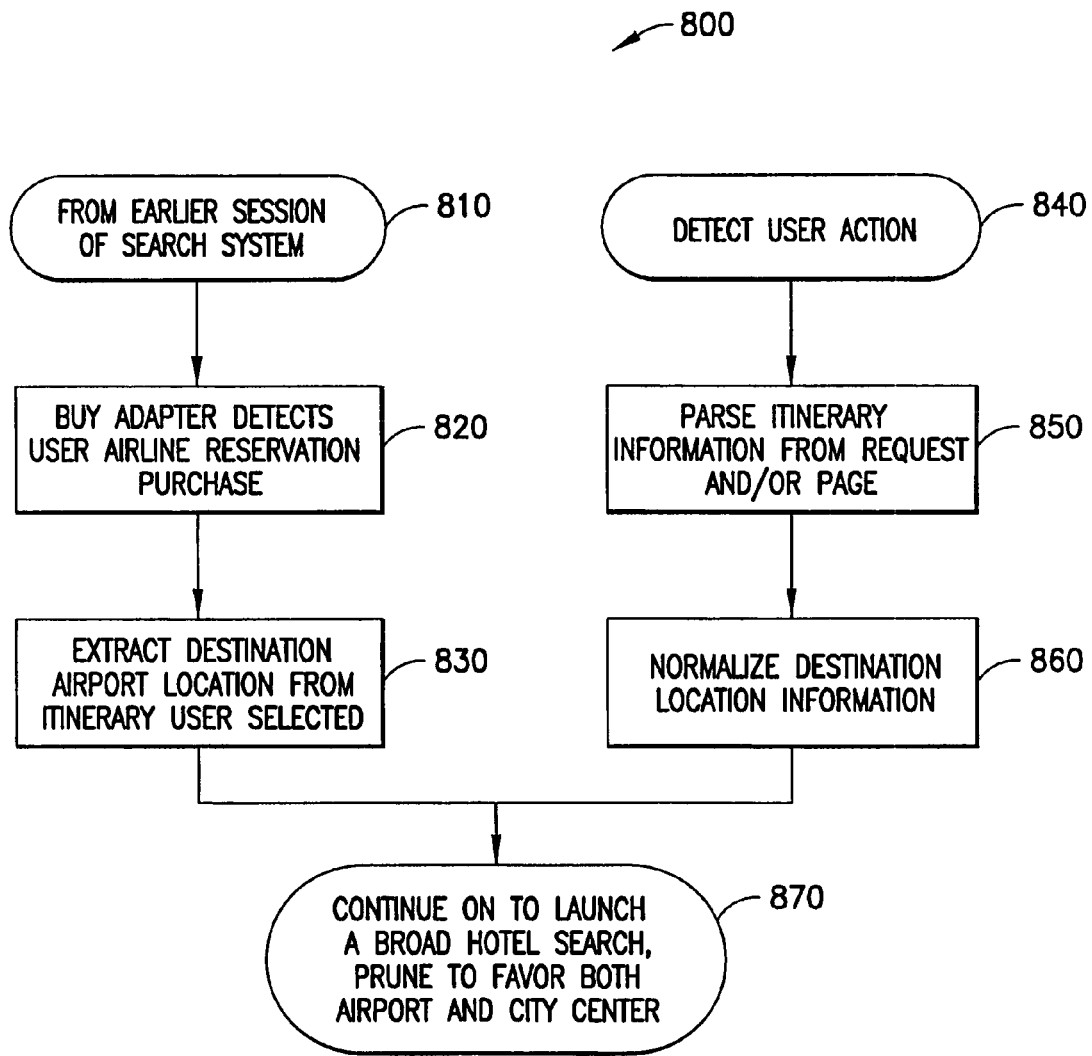
FIG. 8 is a flow diagram of a process for a search for hotel reservation-specific information in response to an airline reservation purchase through a third-party web site.

FIG. 8 is a flow diagram 800 of a process for a search for hotel reservation-specific information in response to an airline reservation purchase through a third-party web site. In an embodiment, there are two ways in which a purchase may be detected to which the system should respond by launching a search. The first case is when the user has previously searched using the system, selected an airline reservation from the search results, and then purchased that reservation by completing the session with the third-party supplier that was originally created by the search system when gathering reservation information. In this case, the search system will likely already have been monitoring the user's interaction with the information (reservation) supplier web site for the purposes of capturing a purchase confirmation.

The second case is when the user has not previously selected a result from the search system in the current session. In this case, the detection of the user's airline reservation purchase on the third party site is analogous to all other captured user actions that may cause the search system to launch a search:

In the first case, where the user is completing a purchase that began with the selection of a result supplied by the search system, the first step toward launching a new search is when the buy adapter detects 820 the user airline reservation purchase. A "buy adapter" is a software component customized to the purchase-complete or "receipt" page of a third party site, and works in conjunction with the user's web browser to capture sufficient information from the page to subsequently prove that a transaction took place. The data collected by a buy adapter can be used by the search system's owner/operator to collect "introduction" or "referral" fees for customers that purchased through a search result.

After the buy adapter has confirmed that a purchase occurred, the search system can extract the destination airport location 830 and the likely checking and checkout dates from the itinerary information from which the purchase was made from the system's user-specific session state.

Having obtained the destination location, the search system can continue 870 with pruning for a "broad" (not specific, not directly price comparing) search for hotel reservations. In searches that start from this particular operation, a "hybrid" distance preference function may be used that had two preference "peaks", one at the location of the destination airport (presuming that the user might prefer to stay at an airport hotel) and the other at the city center (presuming that the user may have plans within the destination city itself).

In the other case, the process of launching begins with the detection of a user action 840 on a third-party web site, perhaps using a web browser with an installed Browser Helper Object as discussed above.

Once the user action is detected, the search system must parse itinerary information 850 from the internet request representing the action and/or from the web page containing the user controls triggered. Unlike other cases in which the system detects a user action, in this case it is likely that the internet request notifying the third-party server of the action does not contain sufficient information to launch a search. In other actions, the user may have entered information into a form on the target web page and the form data is being transmitted to the third-party server along with the request. In this action, the user may simply be selecting one of several choices displayed on a web page. Thus, it may be necessary for the BHO (for example) in this type of system to transmit whole (for server parsing), or to partially parse and then transmit, the content of one or more web pages prior to the triggering action in order to accumulate sufficient information to launch a search.

Once the information has been parsed from the internet request and/or pages, the system should normalize the destination location information 860. This step is unnecessary in the other flow as the information stored within the existing session's last itinerary was presumably already normalized. After the location is normalized, the system can continue 870 to launch a new hotel reservation search as before.

Figure 9A:
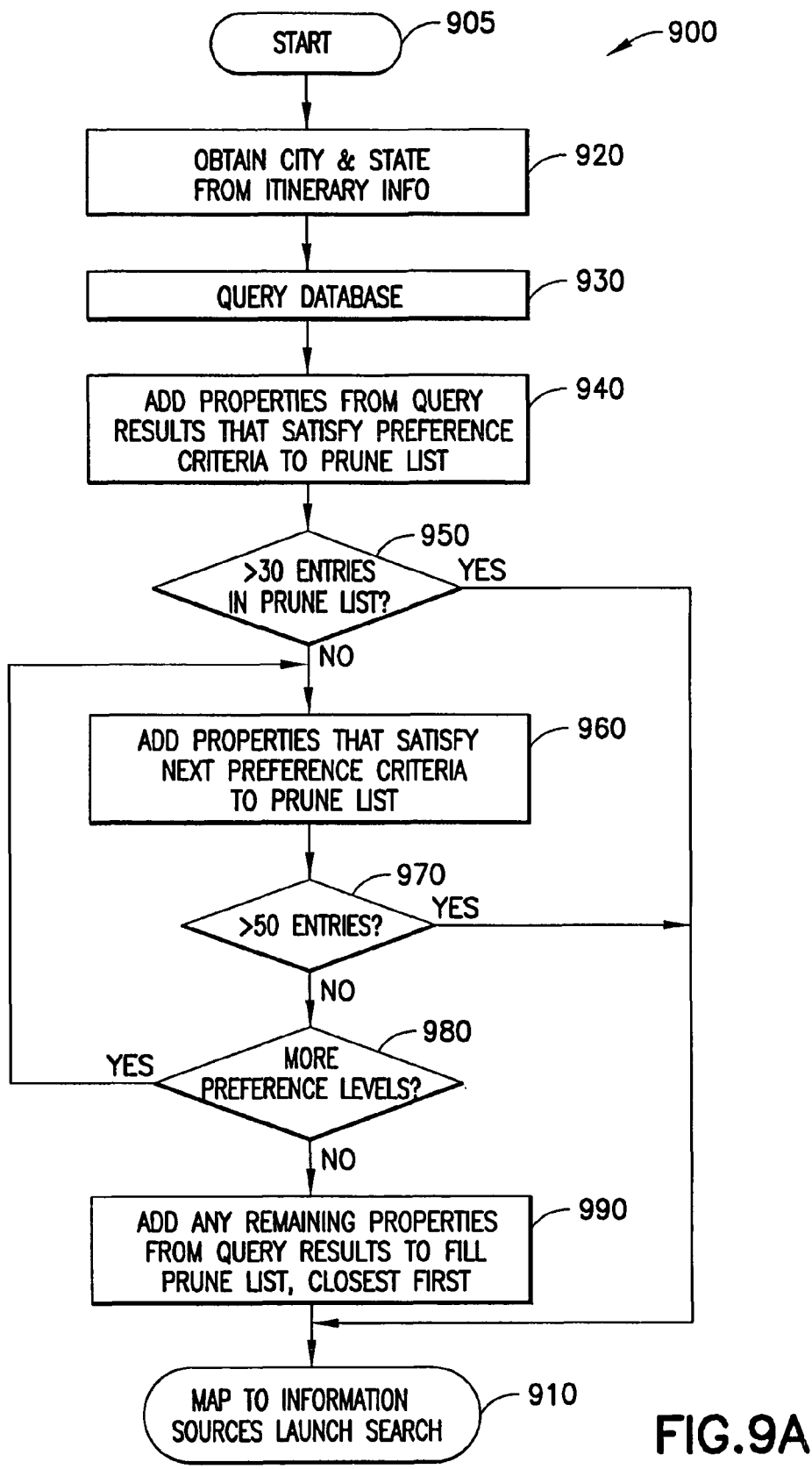
FIG. 9A is a flow diagram of a pruning process for hotel reservation-specific searches, starting from city and state information only, of an embodiment.

FIG. 9A is a flow diagram 900 of a pruning process for hotel reservation-specific searches, starting from city and state information only, of an embodiment. This is the first of three flow diagrams showing: how different types of location information may be used "raw" (without the type of normalization described earlier); and different ways in which supplier preference information may be processed. For the purposes of these pruning examples, it is assumed that the property database queries are performed with the appropriate select criteria to ensure that the properties returned are all within the quality (e.g., "star" rating) limits, room type preferences, etc. specified by the user.

In this example, the process starts by obtaining the City and State from the itinerary information 920. This is then used to query the database 930 of properties for those properties that match the given city and state.

The search system then adds properties 940 from the query results to the property (not information source) pruning list. The properties added will be those from the query results which satisfy a particular (top) preference criterion. This could be a function of multiple preference measures, or it could simply be the grouping of properties into two or more preference levels or categories or tiers.

Next, the size of the pruning list is tested 950 to determine if it has exceeded the minimum number of properties desirable (in this example, 30 properties). If the prune list has exceeded the minimum size, then the search system proceeds to map the list into information sources 910 and launch the search as above.

If enough properties have not yet been added to the pruning list, then add properties 960 that satisfy the next lower preference criteria or level. This is the first action of a loop that can be repeated for any number of discrete preference levels the system may have. After properties are added, the prune list is examined 970 to determine if it has exceeded the maximum size for launching a search (in this example, 50). If it has, then the last-added properties are sorted by preference (or distance alone if no other preference criteria are available) and the least-preferred properties are removed until the prune list is, in this example, 50 properties long. At this point, the system maps the list into information sources 910 and launches a search.

If a search still hasn't been launched, the system checks if there are more preference levels 980. If there are, then it returns to the top of the loop to add properties 960. If there are not, then it sorts all properties from the query results that have not yet been added to the prune list by their distance from the city center, and adds 990 the top (e.g., closest) hotels to the prune list until it has reached its maximum size or the query results are all used up. It then maps the list 910 and continues.

Figures 1, 9B:
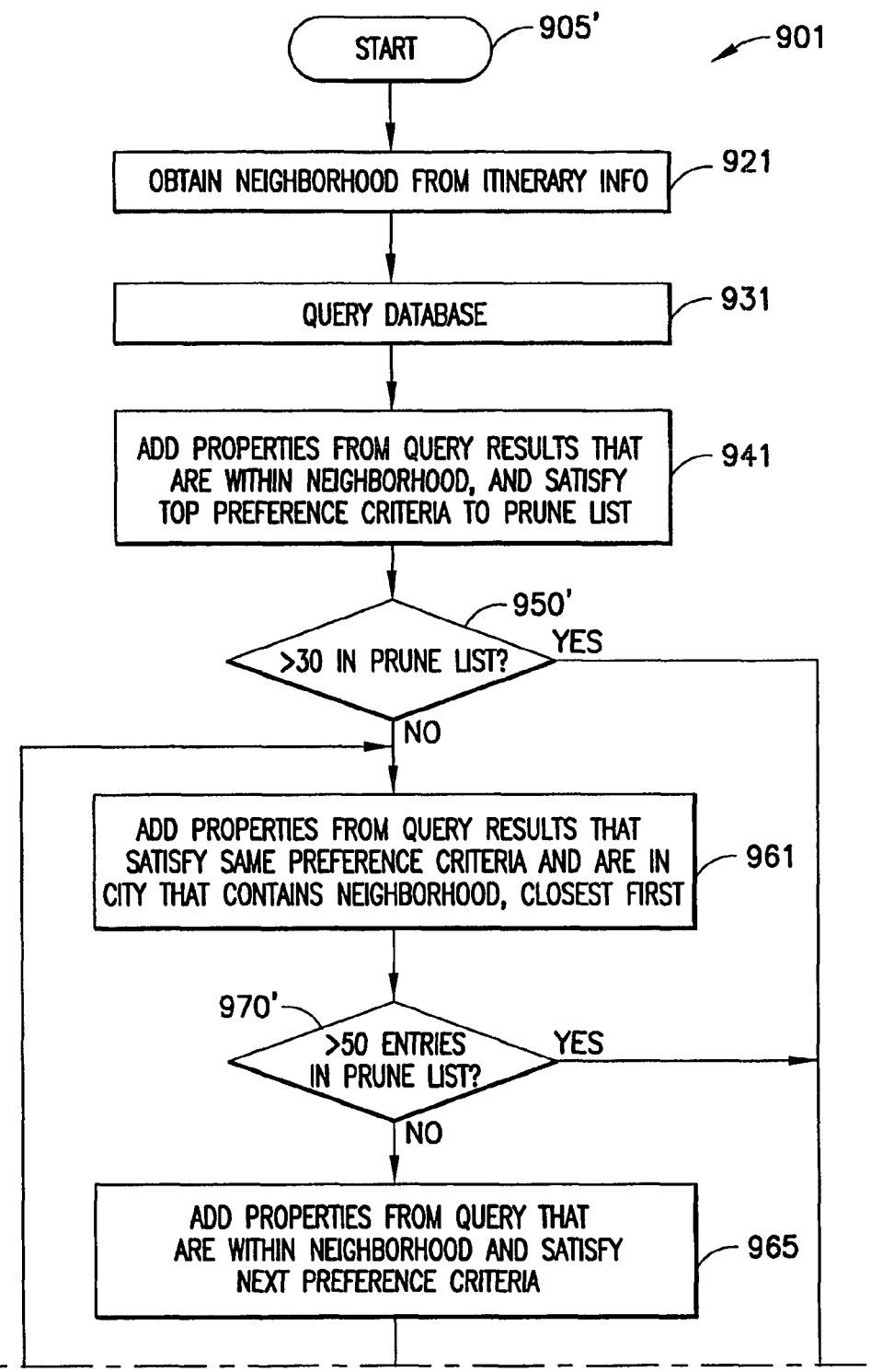
FIG. 9B is a flow diagram of a pruning process for hotel reservation-specific searches, starting from neighborhood information only, of an embodiment.
Figures 2, 9B:
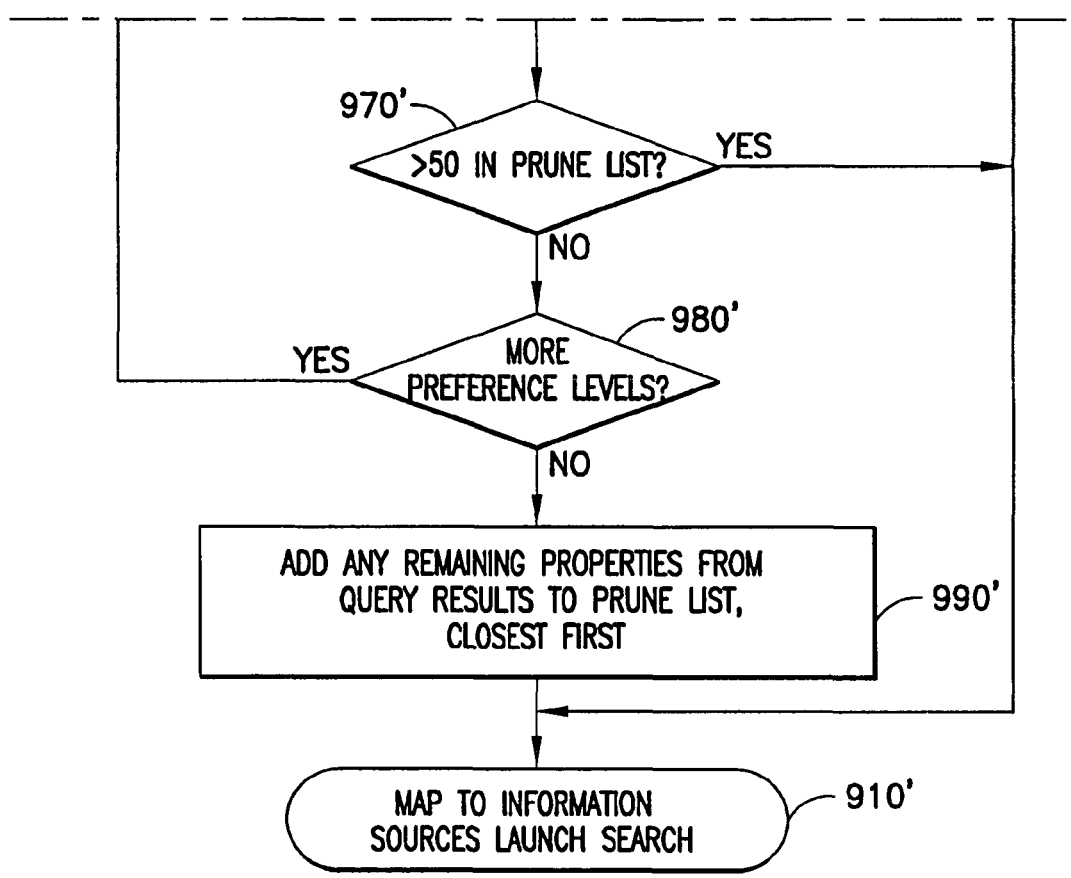

FIG. 9B is a flow diagram 901 of a pruning process for hotel reservation-specific searches, starting from neighborhood information only, of an embodiment.

In this example, the process starts by obtaining the neighborhood from the itinerary information 921. This is then used to query the database 931 of properties for those properties that fall within or are near the neighborhood.

The search system then adds properties 941 from the query results to the property (not information source) pruning list. The properties added will be those from the query results which are both located within the neighborhood and which satisfy a particular (top) preference criteria.

Next, the size of the pruning list is tested 950' to determine if it has exceeded the minimum number of properties desirable (in this example, 30 properties). If the prune list has exceeded the minimum size, then the search system proceeds to map the list into information sources 910' and launch the search.

If enough properties have not yet been added to the pruning list, then add properties 961 that are located within the city that contains the neighborhood and that satisfy the same preference criteria last used to add properties. Note that this is actually the top of the loop and may be repeated for each preference level supported by the system.

After properties are added, the prune list is examined 970' to determine if it has exceeded the maximum size for launching a search (in this example, 50). If it has, then the last-added properties are sorted by preference (or distance alone if no other preference criteria are available) and the least-preferred properties are removed until the prune list is, in this example, 50 properties long. At this point, the system maps the list into information sources 910' and launches a search.

If enough properties have not yet been added to the pruning list, then add 965 properties that are located within the neighborhood and that satisfy the next lower preference criteria or level.

After more properties are added, the prune list is again examined 970'. If it contains 50 or more entries (in this example), it is trimmed down to 50 entries and then the system maps the list into information sources 910' and launches a search.

If a search still hasn't been launched, the system checks if there are more preference levels 980'. If there are, then it returns to the top of the loop to add properties 961. If there are not, then it sorts all properties from the query results that have not yet been added to the prune list by their distance from the neighborhood center, and adds the top (e.g., closest) hotels to the prune list until it has reached its maximum size or the query results have all been added. It then maps the list 910' and continues.

In an embodiment, neighborhood selections may come from two places. First, there are third-party web sites that provide for the entry or selection of neighborhoods. When a user action is detected on such a site, the neighborhood is present in the information captured and parsed. Second, the search system can query the user directly to select a neighborhood. This process is most useful when the user has selected a large city or area. Without further refinement of the user's actual destination, the system is likely to find and present hotel reservation information that is completely unsuitable, failing to aid the user and wasting resources. By detecting the relatively small number of cities that are large enough to cause this problem and presenting the user with a set of neighborhood selections, the user's search can be refined and the results made more useful.

Contra wise, if the itinerary information received identifies an airport, a known landmark, or a street address, prompting the user to select a neighborhood would actually make the search less focused rather than more. Therefore, the system typically will not prompt for a neighborhood selection in these cases. When searching for hotels around one of these "point" types of destinations, any of the lodging-specific pruning methods presented here can be used or adapted for use. This method is particularly suitable if the search system is capable of synthesizing a "virtual" neighborhood in a small region around the desired point.

Figures 1, 9C:
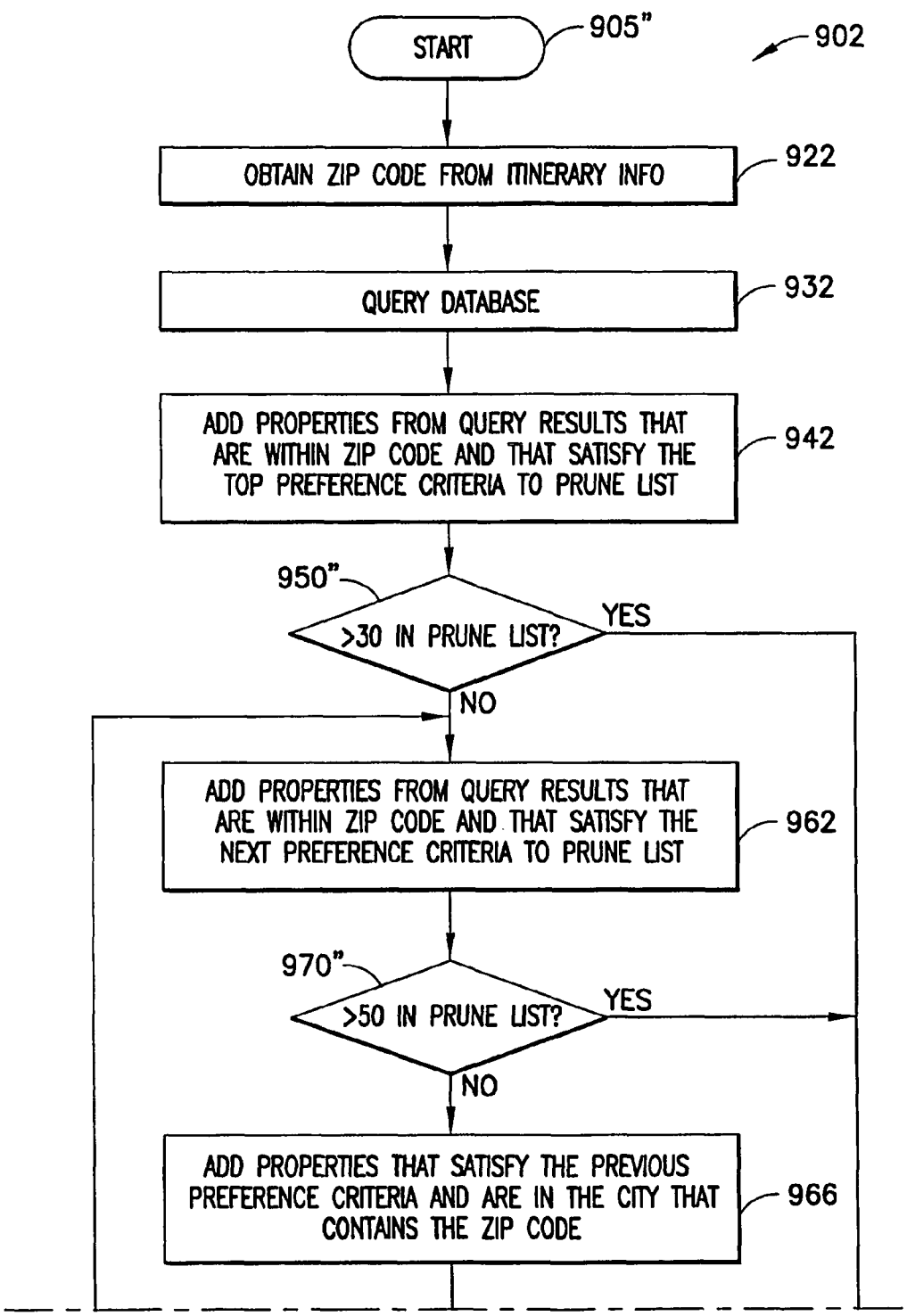
FIG. 9C is a flow diagram of a pruning process for hotel reservation-specific searches, starting from ZIP code information only, of an embodiment.
Figures 2, 9C:
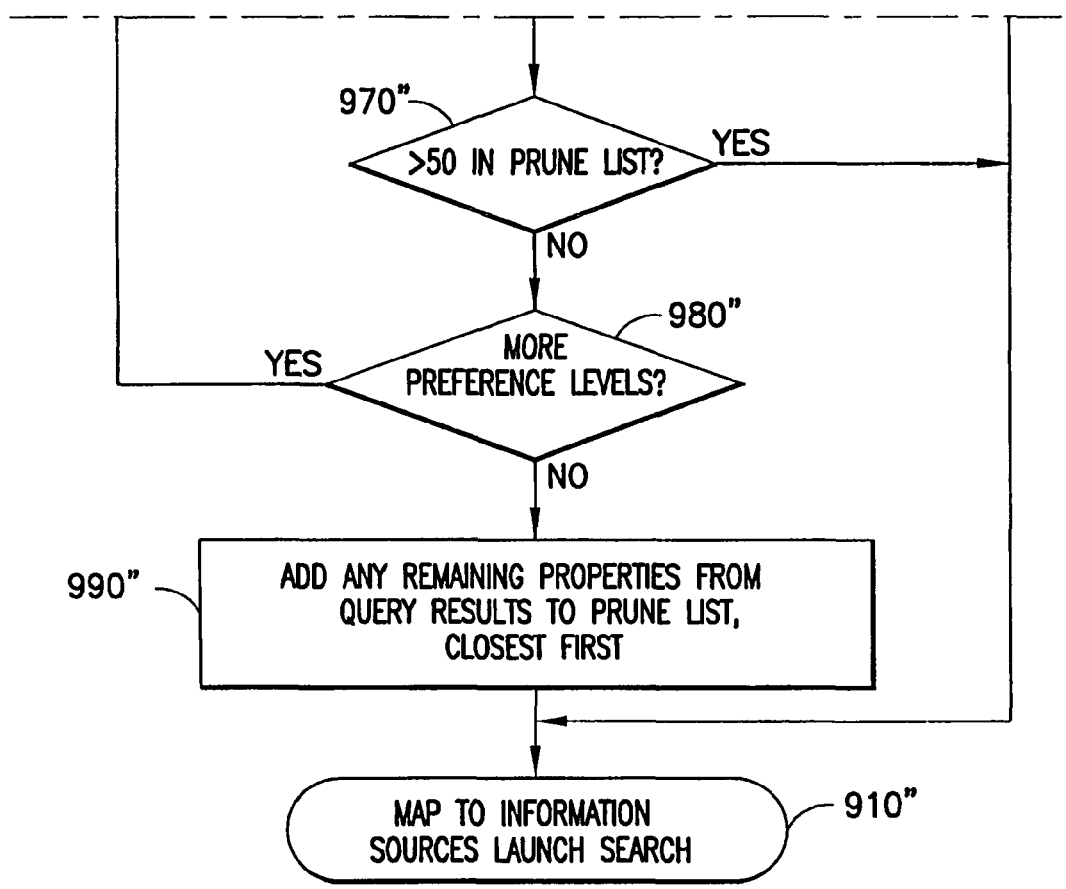

FIG. 9C is a flow diagram 902 of a pruning process for hotel reservation-specific searches, starting from ZIP code information only, of an embodiment. In addition to presenting an example of a ZIP code-only pruning method, this method demonstrates an alternate way of adding relevant properties to the prune list in contrast to that of FIG. 9B.

In FIG. 9B, the various levels of preference are given priority over physical proximity to the center of the search. After the best (most preferred and best geographical match) properties are added to the prune list, more remote properties with the same level of preference are added before moving on to less preferred but closer properties. These two possible types of property additions then continue to alternate through the available preference levels, but more preferred properties will always be placed on the prune list before others.

In this example, that prioritization is reversed. After adding the best properties to the prune list, the close properties that are of the second preference level are added, followed by the more distant properties back at the higher preference level (the top preference level for the first pass through the loop). Which of these procedures is superior for a particular application is likely to depend on subtleties of the particular system and customer base. The examples have been presented in this fashion on the consideration that ZIP codes are typically relatively large, so that it makes more sense to expand the search to less preferred hotels prior to expanding it geographically.

Figure 10:
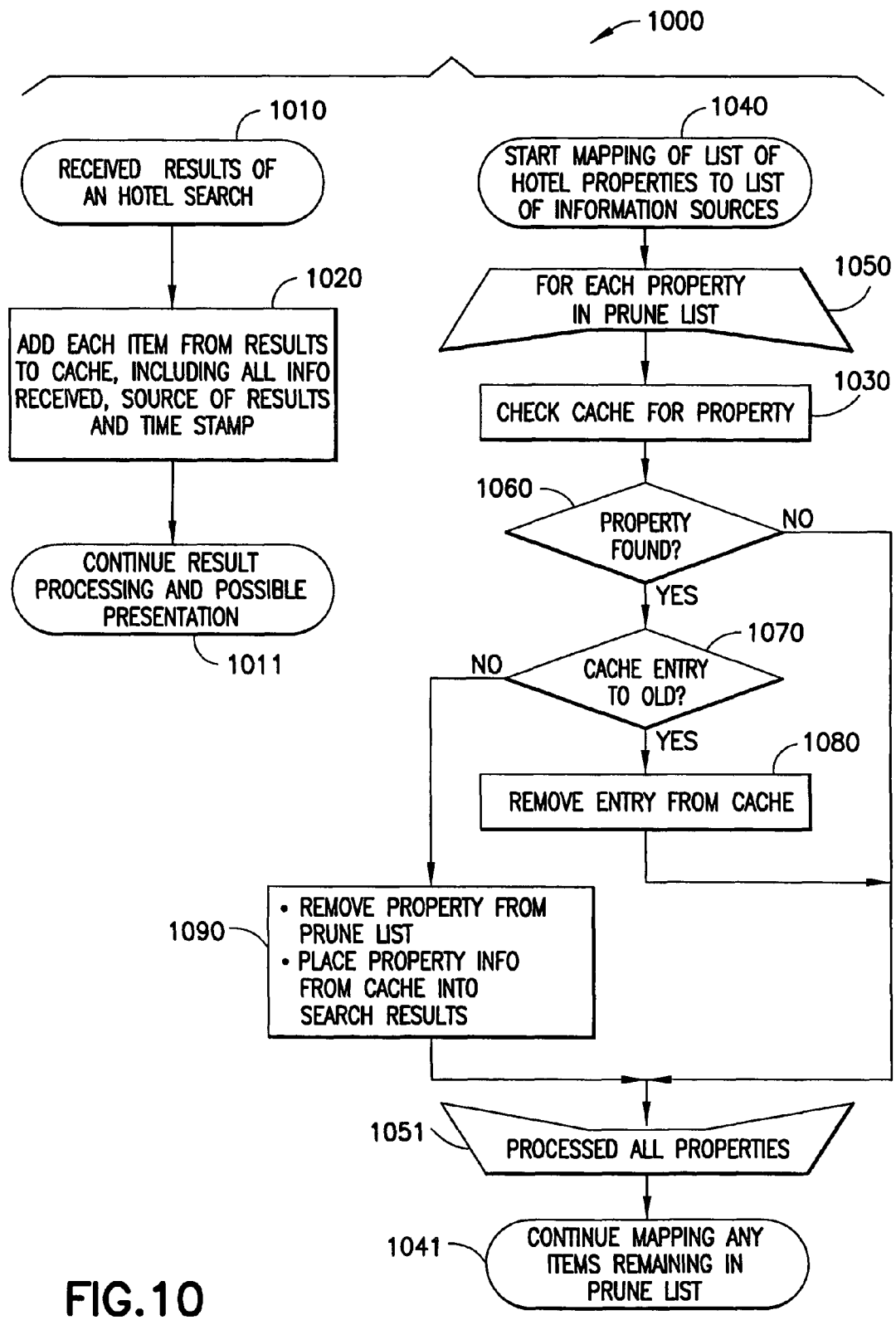
FIG. 10 is a flow diagram of a search pruning process for hotel reservation-specific information incorporating a cache of previous search results of an embodiment.

FIG. 10 is a flow diagram 1000 of a search pruning process for hotel reservation-specific information incorporating a cache of previous search results of an embodiment. While the search methods of the invention are well suited to searching for information that is highly fluid and time variant, some of the information for which a travel-specific system may search is not as fluid as the rest. In particular, hotel reservation availability and especially pricing tends to remain stable for much longer periods than airline reservation availability and pricing. The search system can be further optimized to minimize network usage by short-term caching of some of the less fluid information. This figure shows the application of this type of caching to the pruning of searches for hotel reservation availability and pricing.

There are two asynchronous operations involved in caching. First, when hotel reservation searches are performed, the information received must be placed into the cache in addition to being used for the search operation immediately at hand. Note that in this context, the original reason for each search being performed is not important. Once received, all search results can be placed into the cache on an equal footing. At a minimum, in addition to the information actually received from a source, the cache should contain an ID of the property, an ID of the information source that returned the result, and a date/time stamp recording when the information was received.

This type of caching is different from the indexing process used in generic, text-based search engines. In generic search systems, information is gathered prior to any search operation and placed into the search engine's page index. In the type of caching described here, searches of information sources are still performed only in response to user queries, but in some cases the information is retained in the cache to be used in the future in place of performing another identical search of the information source.

The second portion of using a short-term information cache is integrating the look-up of cache entries into the search pruning process. This integration may be done at the transition between creating a pruning list of properties and mapping that to a pruning list of information sources to be searched. When cache entries are checked during pruning, it is possible for "search results" to be generated earlier in the process than in a system without an information cache, requiring the system to initialize and handle the set of search results earlier in the processing of a user's search than otherwise. Also, the availability of a search result from an information source that would not otherwise have been the system's first choice to search for a particular property may be used to alter the subsequent mapping of the property list into an information source list.

The process for caching new search results begins once the system has received results of a hotel search 1010. The system will then add each item from the results 1020 to the search result cache. Note that it is possible for a search result to be received that has to replace an existing entry in the cache. This possibility is not immediately obvious, since in a closed system the presence of a result in the cache would prevent a search for a new result for that property from a particular information source. However, information sources (particularly third-party web sites) are not necessarily either "well behaved" or deterministic, and a source may elect to return broader results than exactly what was requested. These "opportunistic" results should be cached as well as the results that were desired from a search operation, and the cache must be capable of displacing an old result with an (unexpected) new result for the same property/source if one is received.

After entering new information into the cache, the system will continue result processing 1011 for the particular user query in process.

The portion of the pruning process that takes into account contents of the cache begins when the system is ready to start mapping the list of hotel properties 1040 into a list of information sources that will be searched. Checking the cache is done in a loop that operates for each 1050 property in the pruning list.

For each property, the system checks the cache for that property 1030. If the property is found 1060, the system determines if the cache entry is too old 1070 to use. The definition of "too old" will likely have to be tuned as required, and will depend on a number of factors including the actual fluidity of the information, the importance of reducing the resources being used by the source system, and the system's ability to take advantage of having some search results earlier in the process. However, an appropriate starting value for tuning for a cache that is specific to hotel reservation information could be, for example, 20 minutes. If in a particular system it is difficult to tune a single system-wide time-out value, specific time-out values could be associated with different information sources, groups of information items (e.g., hotel chains), etc. and then tuned independently.

In a system handling purchase-related information where the information stored in the cache includes hand-off information (such as a link to a purchase web page and/or browser cookies), the timeout for the cached information should be shorter than the session's idle timeout period within the information supplier's web server. As a further optimization, the system may integrate the management of the result cache with user item selection and purchase actions. When a user selects a search result presented by the system for a particular hotel reservation and their web browser is directed to the source of that search result, it may be beneficial to remove that result from cache. This will prevent a second user from being presented with that same search result and selecting it, only to discover that the third-party server session associated with that result has been "used" and is no longer available.

If the cache entry is in fact too old (expired), the system will remove that entry from the cache 1080 and conclude the pass through the loop for processing this particular property.

If the cache entry has not expired, the system performs several operations 1090: It removes the current property from the property list, so that it will not be mapped to one or more entries in the information source prune list. It places the information retrieved from the cache into the list of search results that may be presented to the user.

At the bottom of the loop 1051 for processing each property in the prune list, the system determines if there are no more properties that must be processed. If this is the case, the system continues on to mapping any items remaining 1041 in the property list into a list of information sources to be searched.

Figures 2, 11A:
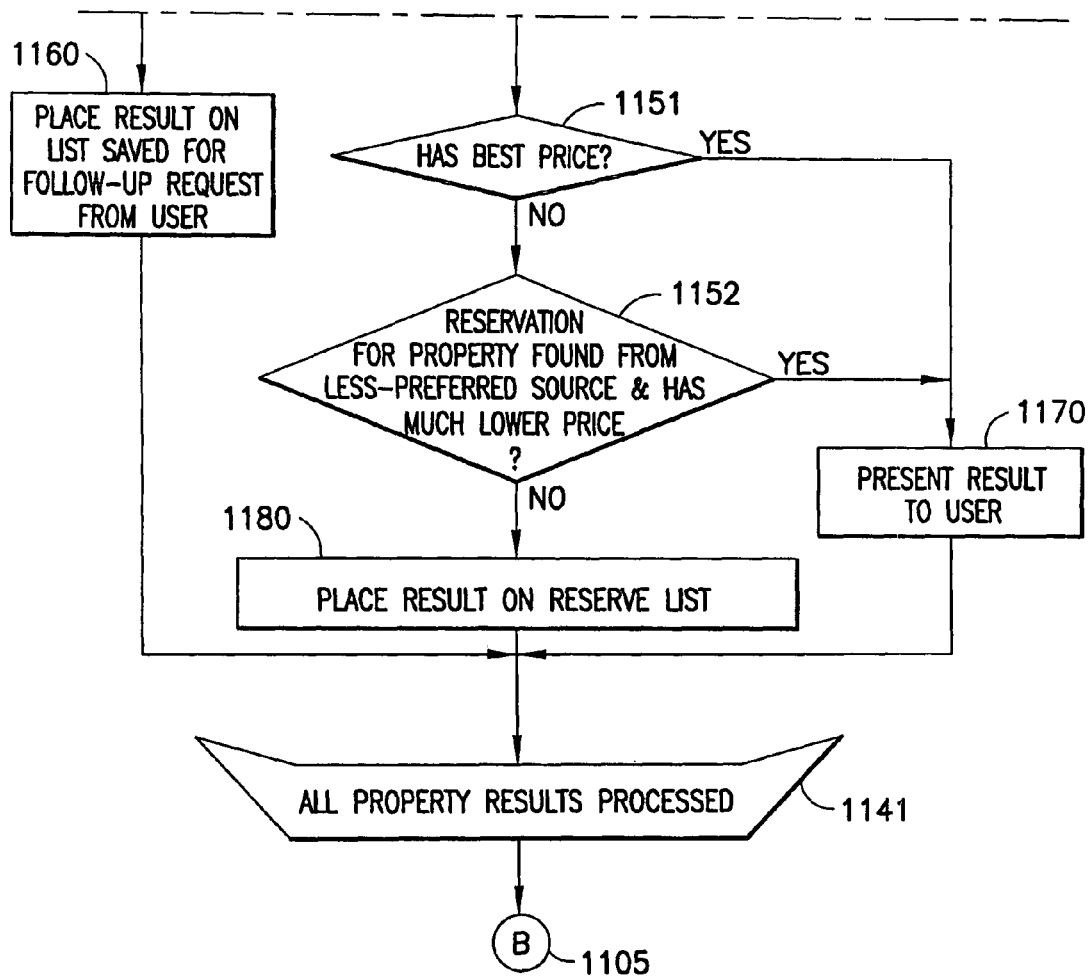
FIGS. 11A and 11B are a flow diagram of a search pruning and result presentation process for hotel reservation-specific information of an embodiment that increases the number of information sources searched that may return results for the same item.
Figure 11B:
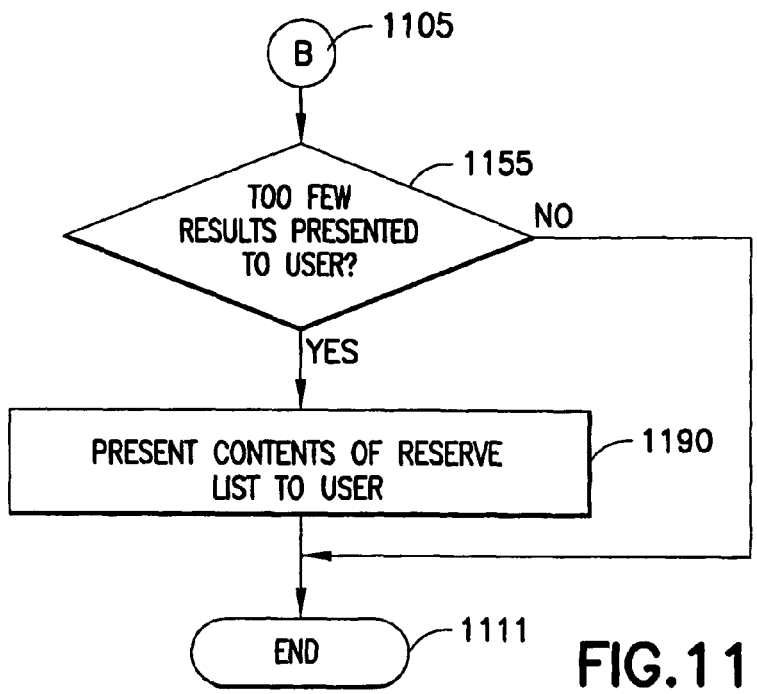

FIGS. 11A and 11B are two parts of a flow diagram 1100 of a search pruning and result presentation process for hotel reservation-specific information of an embodiment that increases the number of information sources searched that may return results for the same item. The flow of the process travels between the two parts of these FIGS. (i.e., FIGS. 11A and 11B) through the connector circle 1105 labeled "B".

Many of the alternate and component pruning methods already presented focus on creating the smallest possible list of information sources that will still produce valuable and useful search results. However, the pruning method example presented in these figures is intended instead to produce a larger list of information sources to search, in the hopes that one of the "redundant" information sources, capable of returning information on the same items as each other, will provide "better" results for that item. In this example, the items are hotel reservations and "better" is often defined as having a lower price.

In this process, the system starts with a prune list 1110 containing the desired hotel properties. Note that it may be desirable to alter the behavior of the upstream pruning process in the case where a broader set of information sources will be searched. How the method is altered, and in particular whether the target number of properties for the initial pruning list should be raised or lowered, will likely best be determined empirically by tuning of an operating system rather than trying to design for the many unknowable factors involved in interacting with third-party systems not designed for and possibly even unaware of the search system's operation.

Beginning with this list, the search system performs a set of steps for a simplified mapping process 1120 to produce the list of information sources that will be searched. In particular: Look up all of the information sources that may return results (reservation information) for each of the desired properties. Do not filter, prune, compare or otherwise omit multiple information sources for each property. Sum all of the information sources found into a new pruning list.

Having created a list of information sources that may contain multiple sources for each desired property, the search system launches searches 1130 of all the information sources in the pruning list. As the individual searches complete, the results received are accumulated in a list. In other types of searches performed by the system, it will often be possible to present results to the user incrementally almost as the results are received from the various information sources. If this is a desirable behavior to retain, the information source list can be annotated with information as it is created indicating what sources are the sole expected source for a particular item (and could therefore be displayed immediately if desired) and which information sources are in groups where the system has to wait for all searches of the grouped sources to be complete before returning the results from any of them.

Processing the search results received is done in a for each loop 1140 that operates once for each property in the original pruning list. First the loop checks if a reservation for the current property was found 1150 from a preferred information source. As always, many factors may go into the system's model for preferences. For example, an information source may be preferred for user-centered reasons (e.g., Does the current user belong to a bonus plan for a particular retailer/information source?) or for system-centered reasons (e.g., Does the search system operator receive a payment for sales made through a particular retailer?). Note also that this pruning example is structured to operate on only one Boolean preference. In another search system aimed at a different information domain or with different user-visible behavior goals, it would be possible to restructure the "how to present" decision within the for each loop 1140 to take into account different preference criteria or a multi-valued spectrum of preference.

If a result was returned by a preferred source, the next check is to see if the result (hotel reservation) returned has the best price 1151 of all the results received for that particular hotel reservation. If it has, then (e.g., essentially immediately) present the result to the user 1170. If a result for the current property was not returned from a preferred source but one or more results were returned by non-preferred information sources, then the search result with the best price is placed on a list 1160 and any other results for that property are discarded. The separate list is maintained as part of the search system's user-specific session information so that these results will be available if the user rejects the results the system initially presents to them and requests additional or follow-up results. After such a request the results from less preferred sources that were held back could be presented to the user.

If the reservation that was found from the preferred source is not the best price, then additional decisions must be made to determine what (if any) result for that property should be presented to the user. The next check is to determine if a reservation for the property 1152 found from a less-preferred source has a much lower price than the other reservations found.

Of course, "much lower" is a limit that is likely both to be specific to a particular type of information and to require tuning as the search system is operated. For example, in this example of a system searching for hotel reservations, "much lower" might be $20 or 15%. In a system searching for used private jet airplanes, a limit of $10,000 still might not qualify as "much lower." Another alternate way to apply a "much lower" comparison would be to present a result from a less-preferred source only if the price is much lower than ALL of the comparable (for example, same star-rated hotel) results returned by preferred information sources.

If the less-preferred source returned a much lower price, then the result from the less-preferred source is presented to the user 1170.

If the less-preferred result is the best (lowest) price for a particular property, but is not "much lower", that search result is placed into a "reserve" list (which will be used in a step farther on) and the other search results for that property discarded.

After all property results 1141 have been processed, the system checks if too few results 1155 have been presented to the user. If this has happened, then the system will present the contents of the reserve list 1190 to the user. These steps combine so that as many results as possible from most-preferred information sources are presented to the user, without either suppressing superior price options or limiting the amount of choice provided the user.

An alternative approach to finding an optimal search result among multiple suppliers of comparable reservations could be accomplished through modification of only the databases that contain properties and are used to map properties to information sources. If these two types of data are combined in a single table, each property may have multiple entries in the database, each entry with a different information source. If this is done, then when a more direct pruning method is employed, such as the examples shown in FIG. 9A through 9C, then an appropriate query of the database will yield multiple records for those properties that may have reservation information available from multiple information sources. These results may then be pruned as described earlier, perhaps with a set of higher limits on the size of the pruning list to account for the fact that more found results will subsequently be discarded. After the searches are performed, the only other step that must be added is to choose the best result received for each particular property prior to presenting to the user.

Figure 12:
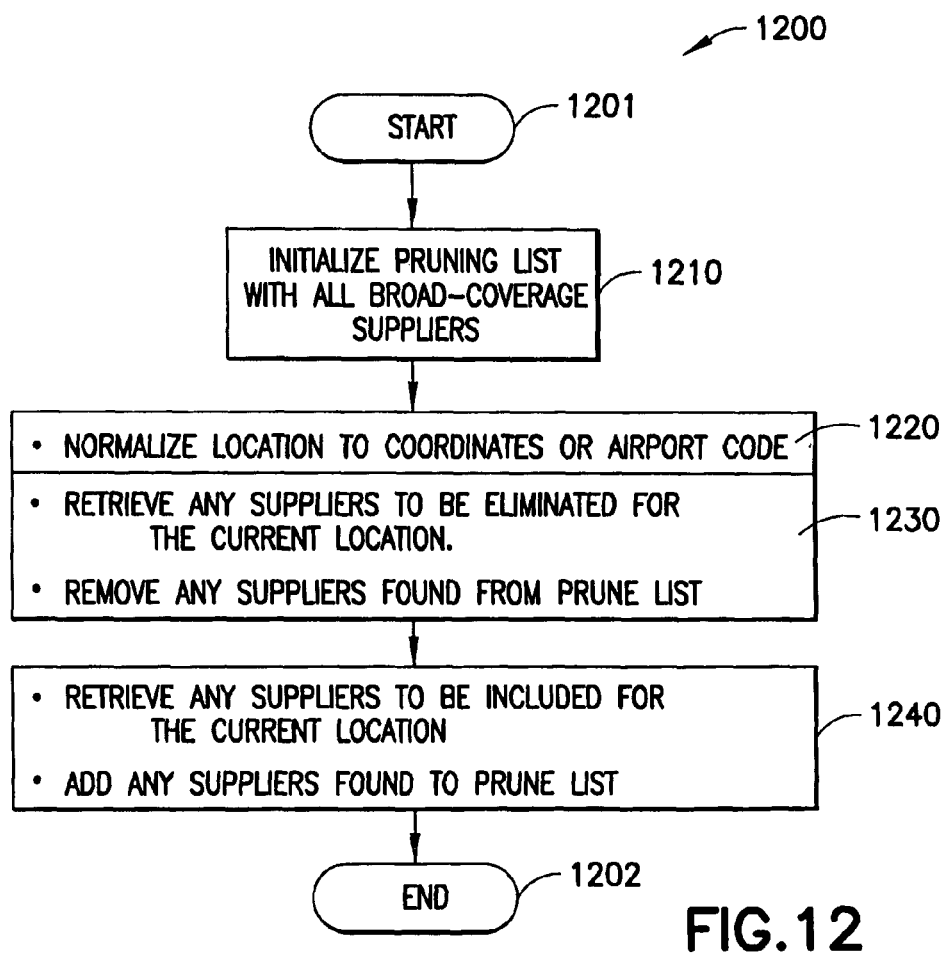
FIG. 12 is a flow diagram of a pruning process for rental car reservation-specific searches of an embodiment.

FIG. 12 is a flow diagram 1200 of a pruning process for rental car reservation-specific searches of an embodiment. As described above, the problem of pruning is less difficult for rental car reservation searches than for airline or hotel reservation searches because (at least within the United States) virtually all rental car outlets are part of a few national chains, and virtually all of the national chains have a presence in each major market and at each airport. Therefore, there are few rental car company captive (chain-specific) reservation web sites that would be pruned out of any rental car reservation search, and much of the potential complexity in rental car search pruning would be created by attempting to obtain competitive search results for the same rental car chain from multiple information sources (that is, by including travel agency and aggregator web sites).

In performing pruning for a rental car reservation search, the first step is to initialize the pruning list 1210 with all of the broad-coverage suppliers. In the case of a rental car reservation search for a pickup location within the United States, the broad-coverage suppliers are essentially the national rental chain companies.

The next step is to normalize the location 1220 from the itinerary into either a set of geographic coordinates or to an airport code in the case where the desired pickup location is an airport.

Next, the search system can remove any suppliers from the pruning list 1230 that do not serve the area in the itinerary. This can be accomplished by fetching any suppliers to be eliminated from a list using the normalized location as an index. Once fetched, any sources to be excluded can be removed from the pruning list.

A similar process can be used to add any local suppliers to the pruning list 1240, by looking up particular suppliers to be added from a list of local suppliers indexed by location.

If desired, an additional level of pruning may be applied to rental car pickups that are not to be made from an airport. The methods previously presented for pruning of hotel searches can be applied analogously to off-airport rental car searches. Since both rental car locations and hotels are distributed through cities, and the user will likely have a particular geographic point that they'd prefer their pickup location be near, non-airport rental car locations are strongly analogous to hotels.

While a number of embodiments of the present invention have been described, it is understood that these embodiments are illustrative only, and not restrictive, and that many modifications may become apparent to those of ordinary skill in the art. For example, any steps may be performed in any desired order, any desired steps may be deleted and/or any desired steps may be added.

What is claimed is:

1. A search method comprising:
using at least one processor to perform:
automatically capturing itinerary information provided, at a user computer, by a user in a first search request including a query regarding available flights meeting requirements of the itinerary information, the first search request provided to a first information source to obtain first search results;
using the captured itinerary information to form, at least in part, a second search request not requested by the user associated with, and for submission to, a second information source separate from the first information source, the second search request including a query regarding available lodging that meets requirements of the itinerary information;
providing the second search request to the second information source separate from the first information source and independent of the first search request to obtain second search results; and
presenting at least some of the first search results and at least some of the second search results to the user at the user computer.

2. At least one non-transitory computer readable medium storing instructions that, when executed by a user computer, perform a search method comprising:
automatically capturing itinerary information provided, at a user computer, by a user in a first search request including a query regarding available flights meeting requirements of the itinerary information, the first search request provided to a first information source to obtain first search results;
using the captured itinerary information to form, at least in part, a second search request not requested by the user associated with, and for submission to, a second information source separate from the first information source, the second search request including a query regarding car rentals that meet requirements of the itinerary information;
providing the second search request to the second information source separate from the first information source and independent of the first search request to obtain second search results; and
presenting at least some of the first search results and at least some of the second search results to the user at the user computer.

3. A user computer for performing a search method, the user computer comprising:
at least one processor configured to perform:
automatically capturing itinerary information provided by a user in a first search request including a query regarding available flights meeting requirements of the itinerary information, the first search request provided to a first information source to obtain first search results;
using the captured itinerary information to form, at least in part, a second search request not requested by the user associated with, and for submission to, a second information source separate from the first information source, the second search request including a query regarding travel deals that meet requirements of the itinerary information;
providing the second search request to the second information source separate from the first information source and independent of the first search request to obtain second search results; and
a display capable of presenting the first search results and the second search results to the user.

4. The method of claim 1 herein the second search request includes a query regarding car rentals that meet requirements of the itinerary information.

5. The method of claim 1, wherein the second search request includes a query regarding travel deals meeting requirements of the itinerary information.

6. The at least one non-transitory computer readable medium of claim 2, wherein the second search request includes a query regarding available lodging that meet requirements of the itinerary information.

7. The at least one non-transitory computer readable medium of claim 2, wherein the second search request includes a query regarding travel deals meeting requirements of the itinerary information.

8. The user computer of claim 3, wherein the second search request includes a query regarding available lodging that meet requirements of the itinerary information.

9. The user computer of claim 3, wherein the second search request includes a query regarding car rentals that meet requirement of the itinerary information.

10. The method of claim 1, further comprising identifying the first information source and the second information source using a pruned set of information source identifiers.

11. The method of claim 10, further comprising identifying the pruned set of information source identifiers by:
generating an initial set of information source identifiers;
applying a set of first level rules to the initial set of information source identifiers to produce an interim set of information source identifiers; and
applying a single set of rules selected from among at least a first set of second level rules and a second set of second level rules to the interim set of information source identifiers to produce the pruned set of information source identifiers.

12. The at least one non-transitory computer readable medium of claim 2, wherein the instructions, when executed, cause the user computer to:
identify the first information source and the second information source using a pruned set of information source identifiers.

13. The at least one non-transitory computer readable medium of claim 12, wherein the instructions, when executed, cause the user computer to:
generate an initial set of information source identifiers;
apply a set of first level rules to the initial set of information source identifiers to produce an interim set of information source identifiers; and
apply a single set of rules selected from among at least a first set of second level rules and a second set of second level rules to the interim set of information source identifiers to produce the pruned set of information source identifiers.

14. The user computer of claim 3, wherein the at least one processor is further configured to:
identify the first information source and the second information source using a pruned set of information source identifiers.

15. The user computer of claim 14, wherein the at least one processor is further configured to:
generate an initial set of information source identifiers;
apply a set of first level rules to the initial set of information source identifiers to produce an interim set of information source identifiers; and
apply a single set of rules selected from among at least a first set of second level rules and a second set of second level rules to the interim set of information source identifiers to produce the pruned set of information source identifiers.

* * * * *